United States Patent [19]

Goto et al.

[11] Patent Number: 5,744,216
[45] Date of Patent: Apr. 28, 1998

[54] MAGNETIC RECORDING MEDIUM HAVING AN UNDERLAYER WITH COBALT CONTAINING PARTICLES OF ALPHA FE₂O₃ OR ALPHA FEOOH

[75] Inventors: Narito Goto; Yasunobu Kobayashi; Hideaki Wakamatsu; Shunichi Iwamaru, all of Hino, Japan

[73] Assignee: Konica Corporation, Tokyo, Japan

[21] Appl. No.: 602,008

[22] Filed: Feb. 15, 1996

[30] Foreign Application Priority Data

Feb. 20, 1995 [JP] Japan .................................. 7-030525
Sep. 29, 1995 [JP] Japan .................................. 7-252943

[51] Int. Cl.⁶ .................................................. G11B 5/708
[52] U.S. Cl. .......................... 428/141; 428/329; 428/403; 428/694 BS; 428/694 BM; 428/900
[58] Field of Search ..................................... 428/141, 329, 428/403, 694 BS, 694 BM, 900

[56] References Cited

U.S. PATENT DOCUMENTS 5,051,303 9/1991 Noguchi et al. ...................... 428/329
5,587,232 12/1996 Hayashi et al. ...................... 428/323

Primary Examiner—Stevan A. Resan
Attorney, Agent, or Firm—Frishauf, Holtz, Goodman, Langer & Chick, P.C.

[57] ABSTRACT

A magnetic recording medium is disclosed, comprising a support having thereon a non-magnetic layer overcoated with a magnetic layer, in which the non-magnetic layer contains a metal oxide or metal hydroxide containing Co. The magnetic layer is overcoated by wet on wet coating.

10 Claims, 2 Drawing Sheets

MAGNETIC RECORDING MEDIUM HAVING AN UNDERLAYER WITH COBALT CONTAINING PARTICLES OF ALPHA $FE_2O_3$ OR ALPHA FEOOH

BACKGROUND OF THE INVENTION

1. (Field of the Invention)

The present invention relates to a magnetic recording medium and particularly to a magnetic recording medium suitably applicable to serve as a magnetic recording disk such as that for floppy disk or still-video floppy disk use, and to the preparation process thereof.

2. (Description of the Conventional Art)

As the functions of a magnetic recording medium have recently been high graded and the many application thereof have also been widened and frequently used, there have also been various improvements of a magnetic recording layer, such as a multilayered magnetic layer, an improvement of the composition or constitution thereof and the arrangement of a characteristic auxiliary layer.

However, in a high-density recording (or a digital recording) in particular, any satisfactory characteristics have not yet been obtained and, even if a non-magnetic layer is arranged to the lower layer, any satisfactory characteristic improvement has not been expected in a high frequency region.

There have further been the disclosures of such a technique that a layer having conductivity is provided to serve as a component layer of a magnetic recording medium.

For example, there have been the following known techniques, namely, the techniques in which a carbon black interlayer for the lower layer is arranged, (see Japanese Patent Publication Open to Public Inspection—hereinafter referred to as JP OPI Publication-Nos. 61-220125/1986 and 2254621/1990), the techniques in which an acrylic type polymer containing sulfonated polystyrene and/or the salts thereof is used, (see JP OPI Publication Nos. 1-185831/1989 and 1-185832/1989) and the technique in which a conductive layer containing a macromolecular charge-transfer complex is provided to serve as a conductive sublayer, (see JP OPI Publication No. 1-232610/1989).

However, when the carbon black lower layer is coated in a wet-on-wet process, (see JP OPI Publication No. 61-220125/1986, for example), a surface is s o mottled as to lower the electromagnetic-conversion characteristics of the subject recording medium.

JP OPI Publication No. 4-325917/1992 discloses such a technique that the characteristics of a simultaneous multi-coating process are improved by containing carbon black in a lower non-magnetic layer so as to serve as a thixotropic paint. In this case, for setting the specific surface resistance of a medium to be lower so as to make the light transmittance of the medium smaller, it has been necessary to contain a large amount of carbon black in the lower layer. However, there has been such a problem that the surface property of the lower layer is deteriorated and, therefore, that the surface property of the upper magnetic layer is deteriorated in its turn, because, generally, carbon black can be hardly dispersed.

JP OPI Publication No. 5-347017/1993 discloses such a technique that a magnetic recording medium is made to have a high density thereof and is improved in the running durability thereof, by containing needle-shaped α-hematite (that is, $\alpha$-$Fe_2O_3$) in a lower non-magnetic layer. In this technique, the multilayer coatability can be improved for sharply improving the rheological characteristics of the lower layer, so that the surface property of the magnetic layer can be improved. However, this technique could not still solve that the aforementioned specific surface resistance of the medium is to be lowered and that the light transmittance thereof is to be made smaller.

For meeting the high capacity of a resent floppy disk or a still-video floppy disk, it has become necessary to improve a durability (particularly during a cycle-thermostatic process), an over-write properties and an error rate. Therefore, the above-mentioned techniques have not been satisfactory to solve the problems.

SUMMARY OF THE INVENTION

It is an object of the invention to provide a magnetic recording medium without having such a problem as mentioned above, and to provide the preparation process thereof.

To be more concrete, the invention is to provide a magnetic recording medium having the following characteristics;

(1) the surface resistance is substantially small and the drop-out property is excellent;

(2) the light transmittance is substantially small and the running stoppage is not produced on a deck;

(3) the durability can be excellent for a long time under the wide surrounding conditions from a high temperature to a low temperature;

(4) there does not produce any error nor noise even in the wide-ranged temperature conditions;

(5) the play-back output can be high and the C/N ratio is excellent;

(6) the over-write properties are excellent; and (7) the surface smoothness is excellent.

The objects of the invention can be achieved by adopting any one of the following constitution.

(1) A magnetic recording medium comprising a support laminated thereon with the first layer and the second layer, characterized in that the first layer is provided closer to the support than the second layer, that the first layer contains a metal oxide or a metal hydroxide, that the metal oxide or the metal hydroxide contains Co, and that the second layer is a magnetic layer;

(2) A method for preparing a magnetic recording medium comprising a support laminated thereon with the first layer and the second layer, characterized in that the first layer is provided closer to the support than the second layer, that the second layer is formed within the time when the first layer is in the wet state, that the first layer contains a metal oxide or a metal hydroxide, and that the metal oxide or the metal hydroxide contains Co;

(3) The magnetic recording medium described in Paragraph (1), characterized in that the metal oxide or metal hydroxide is $\alpha$-$Fe_2O_3$ or $\alpha$-FeOOH;

(4) The magnetic recording medium described in Paragraph (1), characterized in that the metal oxide is $\alpha$-$Fe_2O_3$ and that Co is contained therein in an amount within the range of 0.5 to 30 wt % of the Fe content thereof;

(5) The magnetic recording medium described in Paragraph (1), characterized in that the metal oxide is in the form of $\alpha$-$Fe_2O_3$ particles, that Co is contained in a surface portion of the $\alpha$-$Fe_2O_3$ particles, and that the ratio of Fe:Co is to be within the range of 100:10 to 100:300 in terms of the ratio of the atoms in number;

(6) A method for preparing the magnetic recording medium described in Paragraph (2), wherein the metal oxide or metal hydroxide is α-$Fe_2O_3$ or α-FeOOH;

(7) A method for preparing the magnetic recording medium described in Paragraph (2), wherein the metal oxide is α-$Fe_2O_3$ and Co is contained therein in an amount within the range of 0.5 to 30 wt % of the Fe content thereof;

(8) A method for preparing the magnetic recording medium described in Paragraph (2), characterized in that the metal oxide is α-$Fe_2O_3$, that Co is contained in a surface portion of the α-$Fe_2O_3$ particles, and that the ratio of Fe:Co is to be within the range of 100:10 to 100:300 in terms of the ratio of the atoms in number;

(9) A magnetic recording medium comprising a support provided thereon with a lower layer containing non-magnetic particles and dispersed in a binder and provided further thereon with a magnetic layer containing ferromagnetic particles dispersed in a binder, characterized in that the particles contained in the lower layer is a metal oxide or a metal hydroxide having a needle-form ratio within the range of 2 to 20, that, based on the Fe atoms being regarded as a value of 100 in number, the proportion of Co atoms present in the surface of the particles is within the range of 1 to 100, and that the surface roughness of the magnetic recording medium is not more than 1.5 nm in terms of Ra and not more than 15.0 nm in terms of Rz;

(10) A magnetic recording medium described in Paragraph (9) characterized in that, based on the Fe atoms being regarded as a value of 100 in number, the proportion Si and Al atoms present in the surface composition of the particles contained in the lower layer are both within the range of 1 to 50;

(11) A magnetic recording medium described in Paragraph (10) wherein, based the Fe atoms being regarded as a value of 100 in number, element present ratios of not less than one kind of an alkaline earth metals on the surface composition of the lower layer particles are each to be within the range of 1 to 50;

(12) A magnetic recording medium described in Paragraph (9), wherein the lower layer particles principally comprises α-$Fe_2O_3$;

(13) In a magnetic recording medium comprising a support provided thereon with the lower layer comprising non-magnetic particles dispersed in a binder and further thereon with a magnetic layer serving as the upper layer comprising ferromagnetic particles dispersed in a binder, the magnetic recording medium characterized in that the particles contained in the lower layer is a metal oxide or a metal hydroxide having a needle-form ratio within the range of 2 to 20, that, if the Fe atoms are regarded as a value of 100 in number, the Co element present ratio in the whole lower layer particles composition is to be within the range of 0.5 to 50, and that The surface roughness obtained when the magnetic recording medium is prepared is not more than 1.5 nm in terms of Ra and not more than 15.0 nm in terms of Rz;

(14) A magnetic recording medium described in Paragraph (13) characterized in that, if the Fe atoms are regarded as a value of 100 in weight, the Si and Al element present ratios in the whole composition of the lower layer particles are both to be within the range of 0.1 to 20;

(15) A magnetic recording medium described in Paragraph (14) wherein, if the Fe element present ratio is regarded as a value of 100 in weight in the whole composition of the lower layer particles, not less than one kind of an alkaline earth metals are each contained in a ratio within the range of 0.01 to 200; or

(16) A magnetic recording medium described in Paragraph (13), wherein the lower layer particles mainly comprises α-$Fe_2O_3$.

When making use of a metal oxide or a metal hydroxide such as α-$Fe_2O_3$ or α-FeOOH in the lower non-magnetic layer and, particularly, for designing the layer to keep the specific surface resistance and light transmittance smaller, a large amount of fine conductive particles such as those of carbon black have used so far. However, carbon black is extremely difficult to be dispersed. The electromagnetic conversion characteristics of carbon black have been deteriorated, because the dispersion thereof is deteriorated and the interfacial disorder is produced on the interface between the upper and lower layers. For improving the dispersibility of carbon black, it has become necessary to carry out a separate dispersion by making use of a powerful kneader such as a rollmill and a kneader, besides the other fillers (such as α-$Fe_2O_3$ and α-FeOOH). However, the preparation process has become so complicated as to raise the cost, and it has been difficult to keep the replaying output, because a multilayered surface roughness is produced with making the upper layer thinner.

The present inventors have tried to solve the problems by carrying out the surface treatment of metal oxide or metal hydroxide such as α-$Fe_2O_3$ and α-FeOOH when making or not making use of fine conductive particles such as carbon black. As for the elements applicable to a surface treatment, Si and Al have commonly been known. In the above-mentioned process, it has been effective to improve the dispersibility of α-$Fe_2O_3$ and α-FeOOH. However, it could not succeed to make a surface resistance and light transmittance smaller.

As the result that the present inventors have tried to contain various elements and to surface-treating them, they have discovered that a surface resistance and light transmittance can remarkably be improved by a specific element that is Co in the form of a metal oxide or metal hydroxide such as $Fe_2O_3$ and α-FeOOH. It has not been cleared why Co can bring out the excellent effects. However, the cause thereof may be guessed that a fine oxide layer may be formed by making a large amount of Co present around the surfaces of $Fe_2O_3$ and α-FeOOH. Besides, when containing Co therein, it becomes possible to achieve the fine granulation of $Fe_2O_3$ and α-FeOOH, so that the fine granulation thereof can greatly contribute to the lower layer surface flatness and, in its turn, to the flatness of the uppermost magnetic layer.

Figure 1:
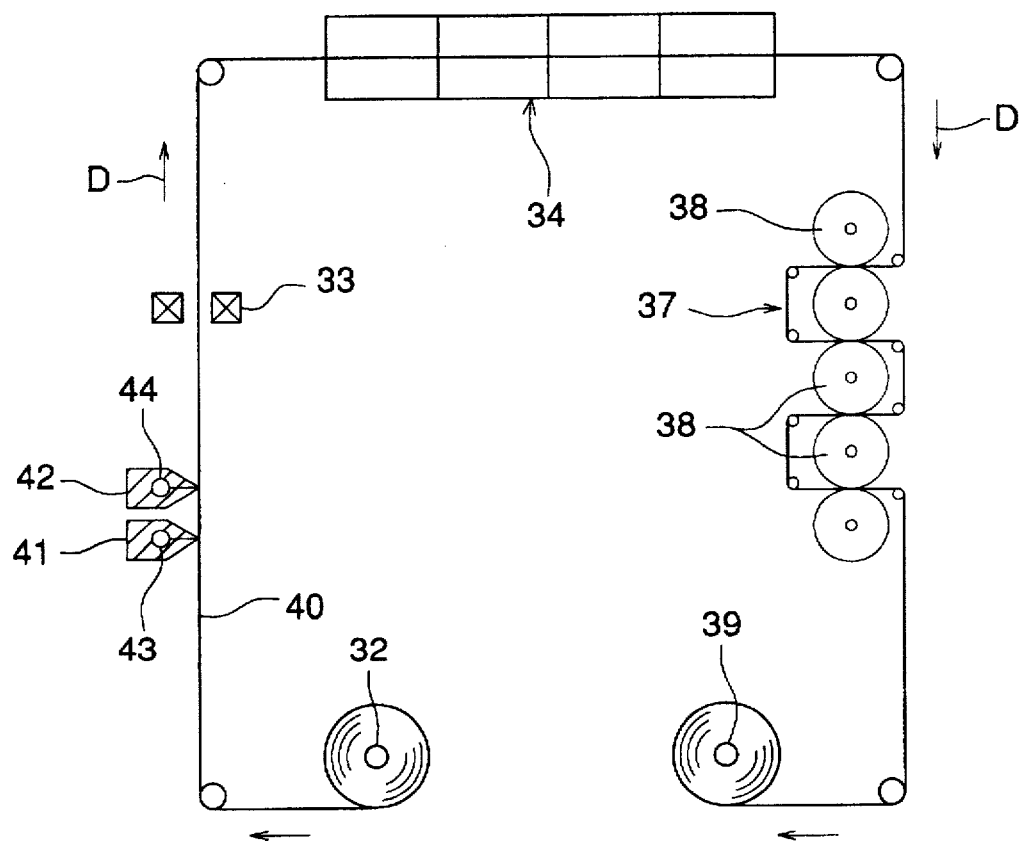
FIG. 1 shows a diagram illustrating a simultaneously multilayer-coating a magnetic layer in a wet-on-wet coating process in an extrusion coating system.

Wherein 1 is a support, 32 is a supply roll, 33 is a magnet for orientation, 34 is a dryer, 37 is a supercalender, 38 is a calender roll, 39 is a take-up roll, 41 is a coater and 42 is another coater.

DETAILED DESCRIPTION OF THE INVENTION

Now, the magnetic recording medium of the invention will be detailed.

Support

The materials for forming the aforementioned support include, for example, polyesters such as polyethylene terephthalate and polyethylene-2,6-naphthalate, polyolefins such as polypropylene, cellulose derivatives such as cellulose triacetate and cellulose diacetate, and plastics such as polyamide and polycarbonate.

There is no special limitation to the forms of the support, but the forms thereof include chiefly a tape-form, a film-form, a sheet-form, a card-form, a disk-form and a drum-form.

There is no special limitation to the thicknesses of a support. In the case of the film-form and the sheet-form, the thickness thereof is ordinarily within the range of 3 to 100 µm and, preferably, 5 to 50 µm. In the case of the disk-form and the card-form, the thickness thereof is of the order of 30 µm to 10 µm. In the case of the drum-form, the thickness thereof may suitably be so selected as to meet the specifications of a recorder or the like.

The support may be either of the single-layered structure or of the multilayered structure, and the non-magnetic support may also be surface-treated in, for example, a corona-discharge treatment.

For the purposes of improving the running property of a magnetic recording medium and preventing an antistatic generation and an erroneous image transfer, it is preferable to provide a back-coat layer to the (back) surface of the support having not been arranged with the above-mentioned magnetic layer. Between a magnetic layer and a non-magnetic layer, a sublayer may also be interposed. On the uppermost magnetic layer, an over-coat layer may further be arranged so as to meet the requirements.

The second layer

Ordinarily, the second layer of the invention is a magnetic layer and it forms the upper or uppermost layer in a magnetic recording medium of the invention.

With a magnetic layer serving as the uppermost layer (or the upper layer) of a magnetic recording medium relating to the invention, the thickness thereof is usually within the range of 0.05 to not thicker than 1.0 µm, preferably 0.05 to not thicker than 0.5 µm and, more preferably 0.05 to 0.3 µm.

Ferromagnetic particles applicable to the invention include, for example, those commonly used as a ferromagnetic particles for a magnetic recording medium. Among them, the preferable magnetic particles include, for example, a ferromagnetic metal particles and a hexagonal system type ferrite particles.

Hexagonal system type ferrite particles

Such a hexagonal system type ferrite as mentioned above comprises barium ferrite, strontium ferrite or the like, and a part of the iron element thereof may be substituted with other elements (such as Ti, Co, Zn, In, Mn, Ge and Nb). The ferrite magnetic materials are detailed in IEEE Trans. on MAG-18 16 (1982).

In the invention, the preferable tabular-formed ferromagnetic particles having a magnetization facilitate axis vertical to the tabular-formed surface include, for example, magnetic particles of barium ferrite (hereinafter referred to as Ba-ferrite).

Magnetic Ba-ferrite particles preferably applicable to the invention is a Ba-ferrite of which a part of Fe is substituted with Co and Zn, and having an average particle-size (a length of the diagonal line of the tabular-formed surface of a hexagonal system type ferrite) of 300 to 900, a tabular-form ratio (a value obtained by dividing the length of the diagonal line of the tabular-formed surface of the hexagonal system type ferrite) of 2.0 to 10.0 and a coercive force of 450 to 1500 Oe.

In a Ba-ferrite particles, by substituting a part of Fe with Co, the coercive force thereof is controlled to have a proper value and, by substituting a part of Fe with Zn, a saturation magnetization is realized so high as is not realized by substituting a part of Fe with Co only, so that a magnetic recording medium can be prepared to be excellent in electromagnetic conversion characteristics capable of displaying a high play-back output. Further, by substituting a part of Fe with Nb, a magnetic recording medium can be prepared to be excellent in electromagnetic conversion characteristics capable of displaying more higher play-back output. Further, in a Ba-ferrite of the invention, a part of Fe may be substituted with a transition metal such as Ti, In, Mn, Cu, Ge and Sn.

The above-mentioned Ba-ferrite is represented by the following formula.

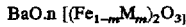

$$BaO.n\,[(Fe_{1-m}M_m)_2O_3]$$

wherein, m is greater than 0.36 (provided that Co+Zn= 0.08–0.3, Co/Zn=0.5–10), n is 5.4–11.0 and preferably 5.4–6.0, M represents a substituted metal, and that magnetic particles comprising a combination of two or more kinds of elements having an average valency of 3 are preferred.

In the invention, the reason why a Ba-ferrite is preferred when it has an average particle-size, tabular-form ratio and coercive force within the above-specified ranges is as follows. When an average particle-size is smaller than 0.04 µm, the play-back output becomes unsatisfactory when a magnetic recording medium is prepared. To the contrary, when exceeding 0.1 µm, the surface smoothness is seriously deteriorated when a magnetic recording medium is prepared, so that the resulting noise-level becomes too high. When the tabular-form ratio is lower than 2.0, a vertical orientation degree suitable for a high-density recording cannot be obtained when a magnetic recording medium is prepared. To the contrary, when a tabular-form ratio exceeds 6.0, the surface smoothness is seriously deteriorated when a magnetic recording medium is prepared, so that the noise-level becomes too high. Further, when a coercive force is lower than 350 Oe, a recording signal can hardly be maintained and, when exceeding 2000 Oe, a saturation phenomenon is produced on a head, so that a recording can hardly be performed.

A Ba-ferrite magnetic particles applicable to the invention is preferable to have a saturation magnetization quantity ($\sigma_s$) that is a magnetic characteristic, of ordinarily not less than 50 emu/g, because the electromagnetic conversion characteristics may be deteriorated when the saturation magnetization quantity is less than 50 emu/g.

Further, in the invention, it is preferable to make use of a Ba-ferrite magnetic particles having a specific surface area of not less than 30 $m^2$/g in terms of BET method, so as to meet the higher density recording requirements.

As for the processes for preparing a hexagonal system type magnetic particles applicable to the invention, there is a process named a glass-crystallizing process in which, for example, an oxide or carbon oxide of each element necessary to form an objective Ba-ferrite is fused together with a glass-forming material such as boric acid, for example, so that the resulting fused liquid is quenched to form a glass and then the resulting glass is heat-treated at a specific temperature so as to deposit the objective Ba-ferrite crystallized particles and, finally, the resulting glass component is removed away in a heat-treatment. Besides the above-mentioned process, a coprecipitating-firing process, a hydrothermal synthesization process, a flux process, an alkoxide process and a plasma-jet process are also be applicable to the invention.

In the invention, the proportion of the above-mentioned hexagonal system type ferrite contained in a magnetic layer is usually within the range of 50 to 99% by weight and, preferably, 60 to 90% by weight.

For getting a satisfactory play-back output of a magnetic recording medium satisfied when the recording medium is prepared, an average particle-size of the Ba-ferrite is to be preferably not smaller than 300. For improving the surface smoothness and lowering the noise level, it is preferable to be not larger than 900. Besides, when the tabular-form ratio is set to be not lower than 2.0, a vertical orientation degree suitable for making a high-density recording can be obtained when a magnetic recording medium is prepared. For improving the surface smoothness and lowering the noise level, it is preferable to set the tabular-form ration to be not higher than 10.0. Further, for maintaining a recording signal, it is preferable to set the coercive force to be not lower than 450 Oe. And, for preventing a head from being saturated, it is preferable to set to be not higher than 1500 Oe.

Ferromagnetic metal particles

The ferromagnetic metal particles applicable to a magnetic layer include, for example, those of Fe or Co and, besides, those of the Fe—Al type, Fe—Al—Ni type, Fe—Al—Zn type, Fe—Al—Co type, Fe—Al—Ca type, Fe—Ni type, Fe—Ni—Al type, Fe—Ni—Co type, Fe—Ni—Si—Al—Mn type, Fe—Ni—Si—Al—Zn type, Fe-Al-Si type, Fe—Ni—Zn type, Fe—Ni—Mn type, Fe—Ni—Si type, Fe—Mn—Zn type, Fe—Co—Ni—P type and Ni—Co type, and a ferromagnetic particles such as a magnetic metal particles comprising principally Fe, Ni or Co. Among them, the Fe type metal particles is excellent in electrical properties.

On the other hand, from the viewpoints of anticorrosion property and dispersibility, an Fe—Al type metal particles such as those of the Fe—Al type, Fe—Al—Ca type, Fe—Al—Ni type, Fe—Al—Zn type, Fe—Al—Co type, Fe—Ni—Si—Al—Zn type and Fe—Ni—Si—Al—Mn type are preferable.

Particularly, a ferromagnetic metal particles preferable for the purpose of the invention is a metal magnetic particles comprising principally iron. It is also preferable that Al or Al and Ca are contained in a weight ratio within the range of Fe:Al=100:0.5 to 100:20 and Fe:Ca=100:0.1 to 100:10. When the ratio of Fe:Ca is set as above, the electromagnetic conversion characteristics can be improved and a drop-out can also be reduced. The reasons why the electromagnetic conversion characteristics can be improved and the drop-out can also be reduced have not been cleared. However, for the reasons thereof, it may be considered that a coercive force is increased and a cohesion production is reduced by improving the dispersibility.

A ferromagnetic metal particles suitably applicable to the invention is to have an average major axis length of not longer than 0.25 μm, preferably within the range of 0.03 to 0.22 μm and, more preferably 0.05 to 0.17 μm when observing the particles through a transmission type electron microscope, and to have an axial ratio (i.e., an average major axis length/an average minor axis length) of not higher than 12, preferably not higher than 10 and, more preferably within the range of 4 to 9. It is also preferable that the X-ray particle-size (that is the crystallite size) of the above-mentioned ferromagnetic metal particles is to be smaller than 200 Å and, particularly within the range of 50 to 180 Å. When making use of ferromagnetic metal particles having an average major axis length of not longer than the above-specified value, and having at the same time an X-ray particle-size and an axial ratio each within the above-specified scope, the substantially high region characteristics including particularly the output of the vertical recording component can be enhanced.

In magnetic particles applicable to the invention, the average major axis length and number average particle-size (in the case of globular-formed particles) are each an average value obtained by measuring the major axis lengths or the average particle-size (in the case of globular-formed particles) of 500 ferromagnetic or non-magnetic particles particles through a transmission type electron microscope. The crystallite-size was measured, in Schoeller's method, through an X-ray diffractometer by making use of the integral width of the diffracted rays on (110) of Fe and by setting Si particles on the basis. The axial ratio was obtained in terms of (an average major axis length/an average minor axis length) by measuring the average major axis lengths and average minor axis length of 500 particles in an electron microscopic photography.

Ordinarily, it is preferable that the above-mentioned ferromagnetic metal particles applicable to the invention is to have a coercive force (Hc) within the range of 600 to 5,000 Oe. When the coercive force is lower than 600 Oe, there may be some instances where the electromagnetic conversion characteristics may be deteriorated. When the coercive force exceeds 5,000 Oe, there may be some instances where an image may not be recordable with an ordinary head. Therefore, it is not preferable when the coercive force is out of the above-mentioned range.

In a ferromagnetic metal particles having an average major axis length, crystallite-size and axial ratio each within the above-specified ranges, the saturation-magnetization quantity ($\sigma_s$) thereof, that is one of the magnetic characteristics, is preferably not less than 120 emu/g and more preferably within the range of 130 to 170 emu/g.

Further, in the invention, it is preferable to make use of a ferromagnetic metal particles having a specific surface area of not less than 30 m$^2$/g and, particularly, not less than 45 m$^2$/g, in terms of a BET method, so as to meet the high-density recording requirements.

It is preferable that the above-mentioned ferromagnetic metal particles is to contain Fe, Al and a rare-earth element atoms as the component elements and is more preferable that the preferable rare-earth element atoms are to be not less than one kind of the atoms selected from the group consisting of the atoms of Sm, Nd, Y, La and Pr.

In the invention, a ferromagnetic metal particles is preferable to have Al atoms of 1 to 20 parts by weight and rare-earth element atoms of 1 to 16 parts by weight each per 100 parts by weight of Fe, in terms of the weight ratios of the elements in the whole ferromagnetic metal particles; and is also preferable to have Al atoms of 70 to 300 in number and the rare-earth element atoms of 0.5 to 100 in number each per 100 Fe atoms in number, in terms of the average present ratio of the elements forming the surface of the ferromagnetic metal particles.

It is more preferable that the ferromagnetic metal particles further contain Na and Ca as the component elements thereof, and that the Na atoms are less than 0.1 parts by weight, Ca atoms are 0.1 to 2 parts by weight Al atoms are 2 to 10 parts by weight and rare-earth element atoms are 1 to 8 parts by weight each per 100 parts by weight of Fe atoms, in terms of the elements present in the whole ferromagnetic metal particles; and that Na atoms in number are 2 to 30, Ca atoms in number are 5 to 30, Al atoms in number are 70 to 200 and rare-earth element atoms in number are 0.5 to 30, in terms of the average present ratios of the elements forming the surface of the ferromagnetic metal particles.

It is further preferable that the ferromagnetic metal particles contains at least one kind of element as the component elements selected from the group consisting of Co, Ni and Si; that Co atoms are 2 to 50 parts by weight, Ni atoms are 2 to 20 parts by weight, Si atoms are 0.3 to 5 parts by weight, Na atoms are less than 0.1 parts by weight, Ca atoms are 0.1 to 2 parts by weight, Al atoms are 1 to 20 parts by weight and rare-earth element atoms are 1 to 16 parts by weight each per 100 parts by weight of Fe, in terms of the weight ratios of the elements present in the whole ferromagnetic metal particles; and that Co atoms in number are less than 0.1, Ni atoms in number are less than 0.1, Si atoms in number are 20 to 130, Na atoms in number are 2 to 30, Ca atoms in number are 5 to 30, Al atoms in number are 70 to 300 and rare-earth element atoms in number are 0.5 to 100 each per 100 Fe atoms in number, in terms of the average present ratio of the elements forming the surface of the ferromagnetic metal particles.

The first layer

The first layer of the invention is usually a nonmagnetic layer and it forms the lower layer in a magnetic recording medium of the invention.

In the lower layer of the invention, a non-magnetic metal oxide or non-magnetic metal hydroxide containing Co is used.

As for these non-magnetic particles, any desired particles may be used, including, for example, $TiO_2$, ZnO, CaO, Mgo, $SnO_2$, $SiO_2$, $Cr_2O_3$, $\alpha\text{-}Al_2O_3$, $\alpha\text{-}Fe_2O_3$, $\alpha\text{-}FeOOH$, and cerium oxide.

Among them, $\alpha\text{-}Fe_2O_3$ and $\alpha\text{-}FeOOH$ are preferable and $\alpha\text{-}Fe_2O_3$ is particularly preferable.

The above-mentioned non-magnetic metal oxide or non-magnetic metal hydroxide each containing Co can be obtained by containing Co inside the metal oxide or metal hydroxide in any well-known process, or by covering the surface of the metal oxide or metal hydroxide with Co.

For example, the case for containing Co into $\alpha\text{-}Fe_2O_3$ will be described. It can be obtained by making use of, concretely, a Co compound such as cobalt sulfate and cobalt chloride and then by mixing the resulting aqueous solution with stirring in an iron oxyhydrooxide slurry. Besides the above, it may also be obtained in such a manner that $\alpha\text{-}Fe_2O_3$ is reacted with the aqueous solution of Co compound such as cobalt sulfate and cobalt chloride and thereby obtaining $\alpha\text{-}Fe_2O_3$ covered on the surface.

In $\alpha\text{-}Fe_2O_3$ applicable to the lower layer in the invention, Co is to be contained therein in a proportion within the range of, preferably, 0.5 to 50 wt %, more preferably 0.5 to 30 wt % and, further preferably 1 to 20 wt % each to the Fe content thereof.

About the lower layer surface composition, the $\alpha\text{-}Fe_2O_3$ is to contain Co in the surface section of the lower layer in a proportion of Fe:Co of, preferably 100:1 to 100:300, more preferably 100:5 to 100:300, further preferably 100:10 to 100:300 and, particularly 100:10 to 100:100 in number.

In the invention, it is suitable to use a non-magnetic particles in the needle-form. When making use of them, the surface smoothness of the non-magnetic layer can be improved and, in addition, the surface smoothness of the uppermost layer comprising a magnetic layer laminated thereon can also be improved.

The non-magnetic layers stated herein include a completely non-magnetic layer (having nil saturated magnetic flux density Bm) and besides a substantially non-magnetic layer (that means a slightly magnetized layer having the order of a Bm of 0.01 to 100 Gauss and an Hc of 200 to 1000 Oe). Particularly when making use of a needle-formed $\alpha\text{-}Fe_2O_3$ for serving as the filler for the lower layer, the Bm of the layer usually becomes 0.01 to 100 Gauss, frequently becomes 0.01 to 100 Gauss and the Hc thereof becomes an Oe of the order of 200 to 1000 Oe. Still in this case, the resulting layer is herein-after referred to as a non-magnetic layer in the invention.

The thickness of the non-magnetic layer is usually within the range of 0.2 to 2.5 µm and preferably 0.5 to 2.0 µm. When the layer thickness is thinner than 2.5 µm, there can hardly produce the so-called multilayered surface roughness, that is, the surface roughness of the upper layer, increased after multilayered, so that the preferable electromagnetic conversion characteristics may not be obtained. On the other hand, when it is thicker than 0.2 µm, a substantially high surface smoothness can be obtained when making a calendering treatment, so that the electromagnetic conversion characteristics can become excellent.

The configuration and axial ratio of the non-magnetic particles can be controlled in a combination of well-known methods when selecting the original raw material for the starting material, selecting the oxidation-reduction conditions and selecting an antisintering agent.

When the above-mentioned needle-form non-magnetic particles or not-needle-formed non-magnetic particles is used in the lower layer of the invention, the major axis length of the former or the average particle-size of the latter is to be within the range of not smaller than 20 nm to not larger than 250 nm, preferably not larger than 220 nm and, particularly not larger than 200 nm. In particular, when a suitable amount of Co is contained therein and making use of a filler having been finely granulated to be not larger than 100 nm, the output thereof can be improved.

The minor axis length of the above-mentioned needle-formed non-magnetic particles is usually within the range of not smaller than 10 nm to not larger than 100 nm, preferably not larger than 80 nm and, particularly not larger than 60 nm.

The axial ratio of the above-mentioned needle-formed non-magnetic particles is usually within the range of 2 to 20, preferably 5 to 15 and, particularly 5 to 10. The term, an "axial ratio", stated herein means a ratio of a major axis length to a minor axis length (a major axis length/a minor axis length).

A specific surface area of the above-mentioned nonmagnetic particles is to be within the range of usually 10 to 250 $m^2$, preferably 20 to 150$m^2$ and particularly 30 to 100 $m^2$.

When non-magnetic particles having the above-specified ranges of the major axis diameter, minor axis diameter, axial ratio and specific surface area, it is preferable from the viewpoints of making excellent the surface property of a magnetic layer that is the uppermost layer as well as the surface property of the non-magnetic layer.

In the invention, it is preferable when the above-mentioned non-magnetic particles is surface-treated with a Si compound and/or an Al compound. When making use of a non-magnetic particles surface-treated as above, the surface conditions of the uppermost layer that is a magnetic layer can be made excellent. The contents of the above-mentioned Si and/or Al compounds may be each within the range of, preferably, 0.1 to 10 wt % of the non-magnetic particles, more preferably 0.1 to 5 wt % thereof and particularly 0.1 to 2 wt % thereof. In the case of the non-magnetic particles, the weight ratio of Si to Al is preferable to be Si<Al. The above-mentioned surface-treatment can be performed in the processes described in, for example, JP OPI Publication Nos. 2-83219/1990 and 7-93740/1995.

In the invention, it is preferable when the above-mentioned non-magnetic particles is surface-treated with a Si compound and/or an Al compound. When making use of a non-magnetic particles surface-treated as above, the surface conditions of the uppermost layer that is a magnetic layer can be made excellent. In the surface constitution of the non-magnetic particles and when Fe atoms are regarded as a value of 100 in number, the contents of the above-mentioned Si and/or Al compounds are within the range of preferably 1 to 50 at %, more preferably 1 to 40 at % and particularly 1 to 20 at %.

In the invention, the above-mentioned non-magnetic particles is preferable to contain an alkaline earth metal. Among the alkaline earth metals, Ca and/or Ba are preferable to be contained. When they are contained therein, the surface conditions of the uppermost layer that is a magnetic layer can further be improved.

In the alkaline earth metal surface constitution of the non-magnetic particles and when Fe atoms are regarded as a value of 100 in number, Ca and Ba are each to be contained in a ratio within the range of preferably 1 to 50 at %, more preferably 1 to 40 at % and particularly 2 to 30 at %.

In the alkaline earth metal surface constitution of the non-magnetic particles and when Fe atoms are regarded as a value of 100 in number, Ca and Ba are each to be contained in a proportion within the range of preferably 0.01 to 20 wt %, more preferably 0.01 to 15 wt % and particularly 0.02 to 10 wt %.

In the lower layer, the content of the above-mentioned non-magnetic particles is to be within the range of usually 50 to 99 wt % of the aggregate amount of the whole component constitution the lower layer, preferably 60 to 95 wt % thereof and, particularly 70 to 95 wt % thereof. When the content of non-magnetic particles or magnetic particles is within the above-specific range, the surface conditions of the uppermost layer that is a magnetic layer and the lower layer can be made excellent.

When the above-mentioned lower layer is coated, oriented and then dried, the lower layer is to have an orientation degree within the range of preferably 50 to 100%, more preferably 60 to 100% and particularly 70 to 100% in terms of the orientation ratio of needle-formed particles contained in the lower layer, when the orientation is parallel to the tape-running direction and is made on the cross-section vertical to the surface of a non-magnetic support member. When the orientation degrees of the non-magnetic particles is within the above-specified range, the surface conditions of the uppermost layer that is a magnetic layer and the lower layer can both be improved.

Carbon black

Carbon black A that is to be contained in a non-magnetic layer is preferable to be a carbon black having a DBP (dibutyl phthalate) oil-absorption within the range of 20 ml/100 g to 110 ml/100 g. For example, they include Raven 5000 (having 12 nm and in 05 ml/100 g), Raven 1255 (23 nm, 58 ml/100 g), Raven 1035 (27 nm, 60 ml/100 g) and Raven 2000 (18 nm, 70 ml/100 g) each manufactured by Columbian Carbon Co., and Black Pearl 1400 (13 nm, 80 ml/100 g), Black Pearl 1300 (13 nm, 91 ml/100 g), Black Pearl 1100 (14 nm, 50 ml/100 g), Black Pearl 900 (15 nm, 64 ml/100 g), Black Pearl L (24 nm, 55 ml/100 g) and Legal 400 (25 nm, 70 ml/100 g) each manufactured by Cabot Co.

As for carbon black B that is to be contained in a magnetic layer, they are to have a number average particle-size within the range of preferably 40 to 500 nm and more preferably 50 to 400 nm, for the purposes of lowering the frictional coefficient of a magnetic layer and improving a running durability.

Also with carbon black A that is to be contained in a non-magnetic layer, the surface property of the upper magnetic layer depends greatly on the surface property of the lower layer as the upper magnetic layer is made thinner. Therefore, the characteristics of carbon black A that is to be contained in the lower non-magnetic layer become essential and it is preferable for improving the dispersibility of the non-magnetic layer to obtain an excellent surface property to select out a carbon black having a number average particle-size within the range of 10 to 40 nm and an oil absorption in terms of DBP value within the range of 20 ml/100 g to 100 ml/100 g.

In this case, the number average particle-size of carbon black A is to be within the range of preferably 10 to 40 nm and more preferably 10 to 30 nm. The oil absorption in terms of DBP value of carbon black A is to be within the range of preferably 30 to 90 ml/100 g and more preferably 40 to 80 ml/100 g.

The proportion by weight of carbon black B to be contained in a magnetic layer is within the range of preferably 0.1 to 5.0 wt % and more preferably 0.2 to 2.0 wt % of magnetic particles used. The proportion by weight of carbon black A to be contained in a non-magnetic layer is within the range of preferably 1.0 to 50 wt % of non-magnetic particles used, more preferably 5.0 to 40 wt % thereof and particularly 12 to 35 wt % thereof.

The oil absorption in terms of DBP value of carbon black B is to be within the range of preferably 110 to 500 ml/100 g and more preferably 130 to 350 ml/100 g.

The methods of adding carbon black may be varied. For example, both of the fine and course particles of carbon black may be so put in a dispersing machine as to be mixed up, or some parts thereof may be put therein in advance and the rest of them may then be put therein at the point of time when the dispersion thereof is progressed to a certain extent. If taking much account of a carbon black dispersion, it is also allowed to prepare a paint in such a manner that the carbon black is kneaded with a magnetic material or a filler and a binder by means of a triple roll-mill or a Banbury mixer and the resulting kneaded material is so dispersed by a dispersing machine as to be served as the paint. If taking much account of a conductivity as in the case of a layer other than a magnetic layer, the carbon black structure can hardly be torn down by adding the carbon black in the latest possible step of a dispersion or solution-preparation process.

It is also allowed to utilize the so-called "carbon master patch", that is prepared by kneading a carbon black with a binder in advance.

In this case, the particle-size of the above-mentioned carbon black is directly measured by the eye through an electron microscope. To be more concrete, a magnetic recording medium, that is a tape, for example, is cut in the longitudinal direction so as to have a thickness of about 700 and the resulting cross-section is observed through a transmission type electron microscope (at an applied voltage of 200 KV and a magnification of 60,000). In this case, the sizes of individual carbon black particles are measured and the number average particle-size of 100 particles is regarded as the "average particle-size" thereof. The foregoing "oil absorption (in the DBP terms)" is regarded as follows. DBP (dibutyl phthalate) is added little by little to 100 g of pigment powder and the resulting pigment is observed while kneading them and, when finding out the point of time when the separate dispersion thereof is changed into a single lump, the resulting DBP amount in ml is regarded as a DBP oil-absorption.

Binder applicable to the invention

The binders applicable to the invention include, typically, resins of the polyurethane, polyester and vinyl chloride types. It is preferable when these resins are to contain at least one kind of polar group selected from the group consisting of —$SO_3M$, —$OSO_3M$, —COOM and —$OPO(OM^1)_2$, —$PO(OM^1)_2$.

In the above-given polar groups, M represents a hydrogen atom or an alkali metal such as Na, K and Li and $M^1$ represents a hydrogen atom, an alkali atom such as those of Na, K and Li or an alkyl group.

The above-mentioned polar groups have an function of improving the dispersibility of ferromagnetic particles and the contents thereof in each resin is within the range of 0.1 to 8.0 mol % and preferably 0.5 to 6.0 mol %. When the contents thereof is less than 0.1 mol %, the ferromagnetic particles dispersibility is lowered and, when it exceeds 8.0 mol %, a magnetic paint is liable to gel. The weight average molecular weight of each resin mentioned above is preferable to be within the range of 15,000 to 50,000.

The binder contents of a magnetic layer is usually within the range of 10 to 40 parts by weight to 100 parts by weight of ferromagnetic particles and preferably 15 to 30 parts by weight thereto.

The binders may be used not only independently but also in combination. In this case, the ratio of polyurethane and/or polyester to vinyl chloride type resin is to be within the range of usually 90:10 to 10:90 by weight and preferably 70:30 to 30:70 by weight.

A polar group-containing vinyl chloride type copolymer serving as a binder can be synthesized in an addition reaction of a copolymer having a hydroxyl group, such as a vinyl chloride-vinyl alcohol copolymer with a compound having a polar group and chlorine atom.

Into the vinyl chloride type copolymer, an epoxy group is preferable to be introduced. The reason thereof is that the thermal stability of the subject polymer can be improved.

When introducing an epoxy group thereinto, the content of the repetition unit having the epoxy group in the copolymer is to be within the range of preferably 1 to 30 mol % and more preferably 1 to 20 mol %.

As for the monomers for introducing the epoxy group, glycisyl acrylate, for example, is preferred.

The techniques for introducing a polar group into a vinyl chloride type copolymer have been well-known. The techniques are described in, for example, JP OPI Publication Nos. 57-44227/1982, 58-108052/1983, 59-8127/1984, 60-101161/1985, 60-235814/1985, 60-238306/1985, 60-238371/1985, 62-121923/1987, 62-146432/1987 and 62-146433/1987. These techniques may also be utilized in the invention.

The above-mentioned polyesters may generally be prepared in a reaction of a polyol with a polybasic acid.

In the above-mentioned well-known process, a polyester (polyol) having a polar group can be prepared of a polyol and a polybasic acid having a polar group in a part thereof.

The polybasic acids each having a polar group include, for example, 5-sulfoisophthalic acid, 2-sulfoisophthalic acid, dialkyl 4-sulfoisophthalic acid, 3-sulfophthalic acid, dialkyl 5-sulfoisophthalate, dialkyl 2-sulfoisophthalate, dialkyl 4-sulfoisophthalate, dialkyl 3-sulfoisophthalate and the sodium or potassium salts thereof.

The above-mentioned polyols include, for example, trimethylol propane, hexane triol, glycerol, trimethylol ethane, neopentyl glycol, pentaerythritol, ethylene glycol, propylene glycol, 1,3-butane diol, 1,4-butane diol, 1,6-hexane diol, diethylene glycol, and cyclohexane dimethanol.

In addition to the above, a polyester introduced other polar group thereinto may also be synthesized in any wellknown process.

Besides, polyurethane may be obtained in a reaction of polyol with polyisocyanate.

As for polyol, a polyester polyol obtained usually in a reaction of polyol with polybasic acid may be used.

Therefore, when making use of a polyester polyol having a polar group as the raw material, polyurethane having a polar group may be synthesized. In the invention, it is preferable for achieving the objects of the invention to make use of an aromatic polyester polyurethane or a cyclohexyl ring-containing polyester polyurethane, which is prepared by making use of a polyester polyol containing an aromatic ring or a polyester polyol containing a cyclohexyl ring.

The polyisocyanates include, for example, diphenyl methane-4,4'-diisocyanate (or MDI), hexamethylene diisocyanate (or HMDI), tolylene diisocyanate (or TDI), 1,5-naphthalene diisocyanate (or NDI), tolidine diisocyanate (or TODI) and lysine isocyanate methyl ester (or LDI).

As for another process, it is also effective to use an addition-reaction of polyurethane having a hydroxyl group with a compound having a polar group and chlorine atom.

The techniques for introducing a polar group into polyurethane have been well-known, of which are described in, for example, JP Examined Publication No. 58-41565/1983 and JP OPI Publication Nos. 57-92422/1982, 57-92423/1982, 59-8127/1984, 59-5423/1984, 59-5424/1984 and 62-121923/1987. These techniques may also be utilized in the invention.

In the invention, the following resins may be used as a binder in combination, in an amount of not more than 20 wt % of the whole binder used.

The resins include, for example, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, a polyvinyl butyral, a cellulose derivative (such as nitro cellulose), a styrene-butadiene copolymer, phenol resin, epoxy resin, urea resin, melamine resin, phenoxy resin, silicone resin, an acrylic type resin, urea formamide resin and various kinds of synthetic-rubber type resins, each having a weight average molecular weight within the range of 10,000 to 200,000.

Other additives

For improving the quality of a magnetic layer in the invention, it is allowed to contain an additive such as a durability improving agent, a dispersant, a lubricant and an abrasive, as the other components of the magnetic layer.

The durability improving agents include, for example, a polyisocyanate. The polyisocyanates include, for example, an aromatic polyisocyanate such as an adduct of tolylene diisocyanate (or TDI) with an active hydrogen compound, and an aliphatic polyisocyanate such as an adduct of hexamethylene diisocyanate (or HMDI) with an active hydrogen compound. The polyisocyanate is preferable to have a weight average molecular weight within the range of 100 to 3,000.

The dispersants include, for example, those given in JP OPI Publication No. 4-214218/1992, Paragraph No. 0093. These dispersants may be used ordinarily in a proportion within the range of 0.5 to 5 wt % to ferromagnetic particles used.

As for the lubricants, an aliphatic acid and/or an aliphatic acid ester may be used. If this is the case, an aliphatic acid may be added in a proportion within the range of, preferably, 0.2 to 10 wt % to ferromagnetic particles used and, more preferably, 0.5 to 5 wt % thereto. When the amount added thereof is less than 0.2 wt %, the running property is liable to lower. When exceeding 10 wt %, aliphatic acid may ooze out on the surface of a magnetic layer, or the output is liable to lower. The aliphatic acid ester is also to be added in a proportion within the range of, preferably, 0.2 to 10 wt % to ferromagnetic particles used and, more preferably, 0.5 to 5 wt % thereto. When the amount added thereof is less than 0.2 wt %, the sill durability is liable to deteriorate. When exceeding 10 wt %, the aliphatic acid ester may ooze out on the surface of a magnetic layer, or the output is liable to lower. When a lubrication effect is desired to be made more higher by making combination use of an aliphatic acid and an aliphatic acid ester, it is preferable to set the proportion of the aliphatic acid to the aliphatic acid ester to be within the range of 10:90 to 90:10 by weight.

Such an aliphatic acid as mentioned above may be either one of monobasic acid or dibasic acid. It is to have carbon atoms within the range of, preferably 6 to 30 in number and, more preferably, 12 to 22. The typical aliphatic acids include, for example, caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecane dicarboxylic acid, and octane dicarboxylic acid.

The typical aliphatic acid esters include, for example, oleyl oleate, isocetyl stearate, dioleyl maleate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laurate, cetyl-2-ethyl hexalate, dioleyl adipate, diethyl adipate, diisobutyl adipate, diisodecyl adipate, oleyl stearate, 2-ethylhexyl myristate, isopentyl palmitate, isopentyl stearate, diethylene glycolmono-butyl ether palmitate, and diethylene glycol-mono-butyl ether palmitate.

In the invention, it is preferable that a non-magnetic layer contains an aliphatic acid ester comprising an unsaturated aliphatic acid and unsaturated alcohol. The particularly preferable aliphatic acid esters include, for example, oleyl oleate, and the particularly preferable glycerol esters include, for example, glycerol trioleate.

The preferable glycerol esters are to have the following formula.

Formula:

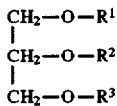

wherein at least one of $R^1$, $R^2$, $R^3$ represents a monobasic aliphatic acid residual group having 6 to 30 carbon atoms in number; the others than the above may be each a hydrogen atoms; and $R^1$, $R^2$, $R^3$ may be the same with or the different from each other. It is more preferable that at least one of the monobasic aliphatic acid residual groups represented by $R^1$, $R^2$, $R^3$ has 10 to 22 carbon atoms in number.)

To be more concrete, the above-mentioned glycerol esters represent preferably the following esters;

(1) An ester comprising glycerol and palmitic acid (having 16 carbon atoms in number) (provided that the ester may be any one of a monoester, a diester and a triester, (and so forth);

(2) An ester comprising glycerol and stearic acid (having 18 carbon atoms in number);

(3) An ester comprising glycerol and oleic acid (having 18 carbon atoms in number and a double bond of unsaturated carbon and carbon);

(4) An ester comprising glycerol and linolic acid (having 18 carbon atoms in number and two double bonds of unsaturated carbon and carbon);

(5) An ester comprising glycerol and lauric acid (having 12 carbon atoms in number);

(6) An ester comprising glycerol and myristic acid (having 14 carbon atoms in number);

(7) An ester comprising glycerol and palmitic acid (having 16 carbon atoms in number);

(8) An ester comprising glycerol and isostearic acid (having 18 carbon atoms in number);

(9) An ester comprising glycerol and behenic acid (having 22 carbon atoms in number);

(10) 2-ethylhexanoic acid triglyceride;

(11) Behenic acid monoglyceride;

(12) Oleic acid stearic acid monodiglyceride;

(13) Diacetyl capric acid glyceride;

(14) Diacetyl coconut aliphatic acid glyceride;

(15) Acetyl stearic acid glyceride;

(16) Diacetyl capric acid glyceride;

(17) Diacetyl coconut aliphatic acid glyceride;

(18) Caprylic acid monodiglyceride;

(19) Acetyl stearic acid glyceride;

(20) Capric acid triglyceride; and

(21) Aliphatic acid ($C_8$, $C_{10}$) triglyceride

(22) Olive oil (natural product, a mixture of glycerin esters

In the above-given glycerol esters, two or more kinds of glycerol esters may be used in combination.

In addition to the glycerol esters, the other polyhydric alcohol esters such as sorbitol may also be used in combination in the invention.

In such an ester comprising an unsaturated aliphatic acid and unsaturated alcohol as mentioned above, the suitable unsaturated aliphatic acid components include, for example, aleic acid, elaidic acid, linolic acid and linolenic acid. Among them, oleic acid is the most preferable. The unsaturated alcohol components include, for example, oleyl alcohol. The examples of the esters comprising the above-mentioned unsaturated aliphatic acid components and the unsaturated alcohol components include, concretely, oleic acid oleyl, elaidic acid oleyl, linolic acid oleyl and linolenic acid oleyl.

In the invention, it is preferable that a non-magnetic layer is to further contain $R^1C(=O)O(CHR^2CHR^3O)_nR^4$ as a lubricant (wherein $R^1$ represents a straight-chained or branched hydrocarbon group having 11 to 22 carbon atoms in number, $R^2$ and $R^3$ represent each H or $CH_3$, $1<n<10$, and $R^4$ represents a saturated or unsaturated hydrocarbon group having 1 to 22 carbon atoms in number). The non-magnetic layer is further preferable to contain $R^5OC(=O)R^6$ as an aliphatic acid ester (wherein $R^5$ represents a straight-chained or branched hydrocarbon group having 1 to 18 carbon atoms in number and $R^6$ represents a straight-chained or branched hydrocarbon group having 11 to 22 carbon atoms in number). By containing several kinds of different aliphatic acid esters and glycerol esters in a non-magnetic layer as mentioned above, the lubricants are suitably supplied to the upper magnetic layer, so that a stable lubrication function can be displayed under the wide circumstances from a high temperature to a low temperature and the durability can greatly be improved. From the viewpoint of improving the durability, the above-mentioned non-magnetic layer is further preferable to further contain a plurality of aliphatic acids each having the different melting points, in addition to the aliphatic acid esters and glycerol esters. For realizing a high-density magnetic disk medium having been improved better than before in high density, high durability and error-rate, it is an essential technique to make use of the above-mentioned hybrid lubricant system combined with a plenty of different lubricants.

The other lubricants applicable thereto, other than the above-mentioned aliphatic acids and aliphatic acid esters, include for example, silicone oil, graphite, fluorocarbon, molybdenum disulfide, tungsten disulfide, aliphatic acid amide and α-olefin oxide.

Next, the concrete examples of the abrasives include α-alumina, fused alumina, chromium oxide, titanium oxide, α-iron oxide, silicon oxide, silicon nitride, tungsten carbide, molybdenum carbide, boron carbide, corundum, zinc oxide, cerium oxide, magnesium oxide, and boron nitride. Such an abrasive as mentioned above is to have an average particle-size within the range of preferably 0.05 to 0.6 μm and more preferably 0.1 to 0.3 μm.

In the invention, an antistatic agent may also be used for the auxiliary purpose. To be more concrete, besides a conductive particles such as those of the foregoing carbon black and graphite, the antistatic agents include, for example, a cationic surfactant such as quaternary amine; an anionic surfactant containing an acid group, such as sulfonic acid, sulfuric acid, phosphoric acid, an phosphoric acid ester and carboxylic acid; an amphoteric surfactant such as aminosulfonic acid; and a natural surfactant such as saponin. The above-given surfactants are usually added in a proportion within the range of 0.01 to 40 wt % of a binder used.
Preparation of magnetic recording medium A magnetic recording medium of the invention is preferable to be coated in the s-called wet-on-wet system in which the upper layer lamination is applied to the lower layer having been in the wet state. The wet-on-wet system is allowed to suitably adopt a process applicable to the preparation of the well-known multilayered structure type magnetic recording media.

Generally, for example, a high density paint is prepared by kneading a solvent with magnetic particles, a binder, a dispersant, a lubricant, an abrasive, an antistatic agent and so forth and the resulting high density paint is then diluted so as to prepare a paint for coating use. After that, the resulting coating paint is coated on the surface of a non-magnetic support.

The above-mentioned solvents applicable thereto include, for example, those given in JP OPI Publication No. 4-214218/1992, Paragraph No. 0119.

When kneading and dispersing the components for forming a magnetic layer, various kinds of kneading dispersers may be used for.

The above-mentioned kneading dispersers include, for example, those given in JP OPI Publication No. 4-214218/1992, Paragraph No. 0112. Among them, the kneading dispersers capable of supplying a demand electric load of 0.05 to 0.5 KW (per Kg of magnetic particles) include, for example, a pressure kneader, an open kneader, a continuous kneader, a double-roll mill and a triple-roll mill.

As shown concretely in FIG. 1, a component layer may be coated on a non-magnetic support in the following manner. The paints are each multicoated, in a wet-on-wet system respectively, by means of extrusion type coaters 41, 42, on a film-formed support 1 unrolled out of supply roll 32. After that, the multicoated support 1 is passed through an orientation magnet or vertical orientation magnet 33 and is then introduced into dryer 34, so that the resulting multicoated support 1 is dried there by blowing a hot-air from the nozzles arranged to the upper and lower positions. Next, the dried multilayered support 1 is introduced into supercalender 37 comprising the combination of calender rolls 38 so as to be calendered and then to be taken up round take-up roll 39. The resulting magnetic film prepared in such a manner as mentioned above is cut into a tape having a desired width, so that a magnetic recording tape for 8 mm-video camera use, for example, may be prepared.

In the above-described process, each paint may also be supplied to extrusion coaters 41, 42, through an in-line mixer (not shown). In the figure, arrow mark D indicates the direction of transporting a non-magnetic base film. Extrusion coaters 41, 42 are each provided with liquid reservoirs 43, 44, so that the paints supplied from each coater are multicoated in the wet-on-wet system. In other words, immediately after coating a paint for the lower component layer (in the undried state), the uppermost magnetic layer coating paints are finally multicoated one after another.

Figure 2:
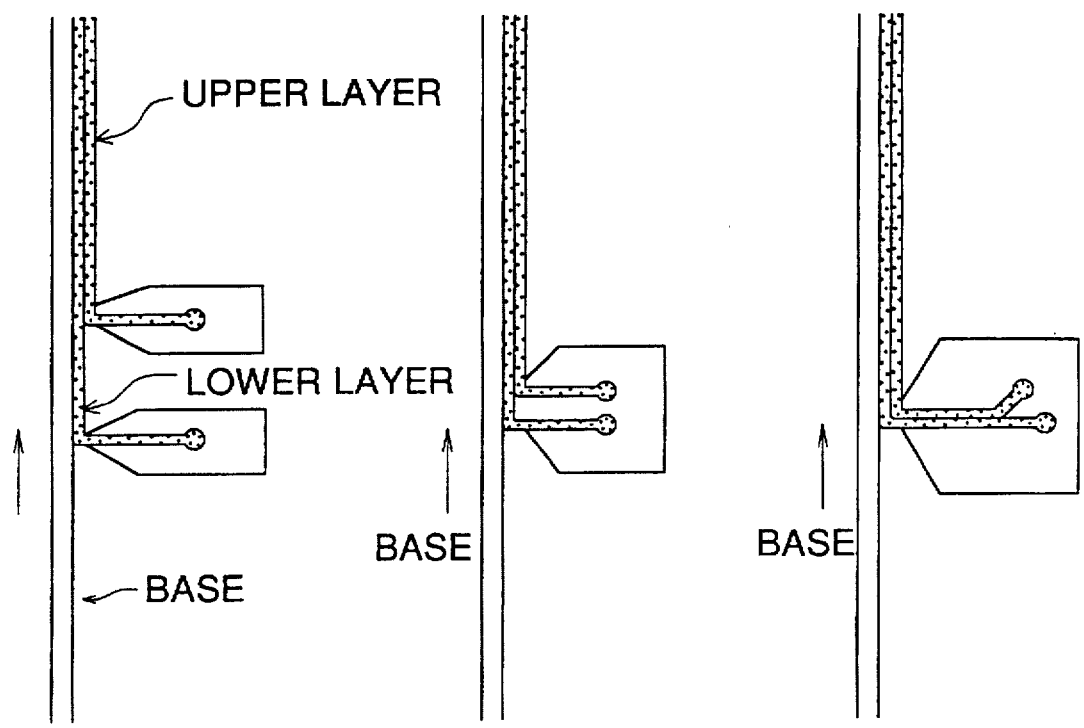
FIG. 2(a), 2(b) and 2(c) show the respective coater heads for coating a paint.

As for the coater head, the head shown in FIG. 2 is preferred for the invention.

When three or more layers are coated in the wet-on-wet system, the lower layer coating paint and the upper layer coating magnetic paint are extruded and multicoated by one or plural extrusion coaters, in such a method in which three or more units of extrusion coaters or an extrusion coater having three or more slits are used.

As for a solvent to be compounded in the above-mentioned paints or a diluted solvent to be used when the paints are coated, those given in JP OPI Publication No. 4-214218/1992, Paragraph No. 0119 may be used therein. Various kinds of these solvents may be used independently or in combination.

The magnetic field of the foregoing orientation magnet or vertical orientation magnet is of the order within the range of 20 to 10,000 Gauss. The drying temperature and drying time when making use of the foregoing dryer are approximately of the orders within the range of 30° to 120° C. and 0.1 to 10 minutes, respectively.

In the wet-on-wet system, a combination of a reverse roll and an extrusion coater, that of a gravure roll and an extrusion coater, or the like may be used. Besides the above, it is also allowed to use a combination of an air-doctor coater, a blade coater, an air-knife coater, a squeeze coater, an impregnation coater, a transfer roll coater, a kiss coater, a cast coater, a spray coater and so forth.

In a multicoating operation carried out in the wet-on-wet system, the upper magnetic layer is coated in such a state that the lower layer positioned under the upper layer remains wet. Therefore, the surface of the lower layer (that is the interface between the lower layer the uppermost layer), so that, at the same time, the surface property of the uppermost layer can be made excellent and the adhesive property between the upper and lower layers can also be improved. Resultingly, the characteristics required a high output and low noise for performing a high-density recording operation can become satisfactory. For example, the requirements of the characteristics for a magnetic tape can become satisfactory. At the same time, for satisfying the requirements for a high durability, a coated layer delamination can be eliminated and a layer strength can also be improved, so that the durability can become satisfactory. Further, in the wet-on-wet multicoating system, a drop-out phenomenon can also be reduced so as to improve the reliability.

Surface smoothening treatment

Next, it is also advisable for the invention to carry out a calendering surface smoothening treatment. Thereafter, a varnish or blade treatment is carried out if required and the recording medium is then slit apart.

In the surface smoothening treatment, the calendering requirements include, for example, the conditions of a temperature, a linear pressure, a coating speed (or c/s).

It is commonly preferable in the invention to keep the above-mentioned temperature of 50° to 140° C., the linear pressure of 50 to 400 kg/cm and the c/s of 20 to 1,000 m/min.

In the invention, the surface of a medium is required to be smoothened. When it is smoothened, a spacing loss between the medium and a head can be eliminated, so that a high output magnetic recording medium can be prepared.

After carrying out a calendering and varnishing or blading treatments in the invention, the surface roughness is preferably 0.3 to 1.5 nm in terms of Ra and 3.0 to 15.0 nm in terms of Rz and, more preferably, 0.5 to 1.3 nm in terms of Ra and 5.0 to 13.0 nm in terms of Rz. When the smoothness exceeds the above-specified values, friction may be so increased as to produce an erratic adhesion on the medium running system and therefore the medium may be in danger of making it impossible to use. The reason why the specification is made in the two parameters of Ra and Rz is that the two parameters are complementary with each other. To be more concrete, an Ra value (that is a center-line mean roughness value) is obtained by integrating a roughness value so as to find the mean roughness value in the whole base length. Therefore, a mean roughness can be found, but the altitudes of the peaks themselves cannot be found. On the other hand, an Rz value (that is a t en point average roughness value) is obtained by taking five higher peaks from the highest to the 5th in the base length and five lower peaks from the lowest to the 5th in the base length so as to find a difference between mean values of each of the peaks. Therefore, the mean value of the peaks themselves can be found. The definition with respect to Ra and Rz is described in Japanese Industrial Standard, JIS B 0601.

In the dried lower coated layer applicable to the invention, that is claimed in claim 3, the average ratio of the elements made present therein for forming the surface of α-iron oxide particles is measured to find the value thereof through an XPS surface analyzer:

The process thereof will be detailed. An XPS surface analyzer is so set as to be in the following conditions.

X-rays anode:Mg

Resolving power:1.5 to 1.7 eV (that is specified by the half-width at a clean Ag 3d 5/2 peak)

There is no special limitation to the XPS surface analyzers, but any types and models thereof may be used for. In the invention, however, Model ESCALAB-200R manufactured by VG Co. was used.

A narrow scanning was carried out within the following measurement range, so that the spectra of each element were measured. At that time, it is required that the data taking intervals is set to be 0.2 eV and an integration is to be made until the objective peak is counted up to an count exceeding the following lowest count.

| Peak | Measurement range (Bond energy eV) | Lowest detected intensity (Count) |
|---|---|---|
| C1s | 305–2 | Optional |
| Fe2p3/2 | 730–700 | 600,000 |
| Na (K123L23) Auger peak | 280–250 | 600,000 |

The energy position is so corrected as to correspond to the resulting spectra by setting the C1s peak position to be 284.6 eV.

Next, for processing on a COMMON DATA PROCESSING SYSTEM Ver. 2.3 manufactured by VAMAS-SCA-JAPAN (hereinafter abbreviated to VAMAS Soft), the above-mentioned spectra are transferred to a computer capable to using the VAMAS Soft by making use of a soft available by each instrument manufacturer. After the transferred spectra are converted into a VAMAS Format by making use of VAMAS Soft, the data processing is carried out.

In advance of starting a quantitative processing, each element is calibrated by a Count Scale and a five-point smoothing treatment is then carried out. Around the peak positions of each element, a peak area intensity (or cps*eV) is obtained in the quantitative range shown in the following table. The atoms in number of each element are obtained by making use of the following sensitivity coefficient. The resulting atoms in number is made to be a quantitative value by converting them into the atoms in number corresponding to 100 Fe atoms in number.

| Element | Peak position (B.E.: eV) | Quantitative range (B.E.: eV) | Sensitivity coefficient |
|---|---|---|---|
| Fe | Around 719.8 | 5 eV on high B.E.side 7 eV on low B.E.side | 10.54 |
| Na | Around 264.0 | 2 eV on high B.E.side 6 eV on low B.E.side | Min. value around 7.99 |

The other elements than the above-given elements were measured under conditions.

TABLE 1

(Measurement conditions of α-iron oxide particles surface composition in a lower coated layer)

| Element | Measurement range (B.E.) | Lowest count | Quantitative range (value from a peak position) | Sensitivity coefficient |
|---|---|---|---|---|
| Nd | 244–220 | 50,000 | 6eV on high B.E.side, 6 eV on low B.E. side | 2.710 |
| Y | 172–152 | 100,000 | 6eV on high B.E.side, 5eV on low B.E. side | 6.240 |
| La | 854–830 | 1,000,000 | 9eV on high B.E.side, 6eV on low B.E. side | 26.490 |
| Si | 165–145 | 60,000 | 5eV on high B.E.side, 6 eV on low B.E. side | 0.855 |
| Al | 88–68 | 50,000 | 4eV on high B.E.side, 4eV on low B.E. side | 0.570 |
| Ca | 366–342 | 100,000 | 10eV on high B.E.side, 5eV on low B.E. side | 5.130 |
| Ba | 808–790 | 1,000,000 | 5eV on high B.E.side, 5eV on low B.E. side | 17.040 |
| Sr | 150–130 | 300,000 | 5eV on high B.E.side, 4eV on low B.E.side | 5.290 |
| P | 150–125 | 100,000 | 6eV on high B.E.side, 6eV on low B.E.side | 1.250 |

TABLE 1-continued (Measurement conditions of α-iron oxide particles surface composition in a lower coated layer)

| Element | Measurement range (B.E.) | Lowest count | Quantitative range (value from a peak position) | Sensitivity coefficient |
|---|---|---|---|---|
| Co | 800–770 | 1,000,000 | 12eV on high B.E.side, 8eV on low B.E.side | 12.200 |

\<Sample preparation method\>

In advance of carrying out the above-mentioned measurement, the subject medium (that is a magnetic tape, for example) is to be pretreated.

The binder resin is removed from the tape in a plasma cryogenic reducing-to-ashes treatment so as to expose the magnetic particles. In the treatment, the conditions where the binder resin can be reduced to ashes, but the magnetic particles cannot be damaged are to be selected. For example, after the tape is treated by the following apparatus and in the following conditions, the measurement is carried out to find the average present ratio of the elements forming the surface of the oriented ferromagnetic metal particles.

| | |
|---|---|
| Apparatus used: | PL-850X manufactured by Meiwa Trading Co. |
| Treatment Conditions: | Forward power 100 W |
| | Reflected power 5 W |
| | Vacuum degree 10 Pa |
| | Gas introduced Air |
| | Discharging time 1 min. |

\<Measurement on the whole constitution\>

The fluorescent X-ray intensity of each element is measured through a wavelength-scattering type fluorescent Xray analyzer (WDX) and, then, the weight ratio of the elements contained in the whole α-iron oxide particles claimed in claim 4 and the weight ratio of the elements contained in the whole ferromagnetic metal particlemade in accord by the calculation made in accordance with a fundamental parameter method (hereinafter abbreviated to FP method).

For performing the fluorescent X-ray measurement, a WDX System 3080 manufactured by Rigaku Denki Co. is used in the following conditions.

X-ray tube used: a rhodium tube

Output: 50 KV, 50 mA

Spectral crystal:LiF (to Fe, Co, Ni, Nd, La, Y, Sr, Ca, Ba). PET (to Al), RX-4 (to Si), RX-4 (to Na) and GE (to P)

Absorber/Al:1/1 (except that absorber/Fe is 1/10)

Slit:Coarse

Filter:Out

PHA:15–30 (to Ai, Si, Na, P) and 10–30 (to Fe, Co, Ni, Nd, La, Y, Sr, Ca, Ba)

Number counting time:a peak=40 sec. and a background= 40 sec., (wherein two points before and after the peak were measured.)

For measuring the fluorescent X-rays, there is no limitation to the above-mentioned apparatus, but various apparatuses may be used.

For the control samples, the following 8 kinds of metal compounds are used.

Control sample 1 is an alloy, SRM1219 manufactured by Analytical Reference Materials International Inc., (containing C in 0.15 wt %, Mn in 0.42 wt %, P in 0.03 wt %, Si in 0.55 wt %, Cu in 0.16 wt %, Ni in 2.16 wt %, Cr in 15.64 wt %, Mo in 0.16 wt % and V in 0.06 wt %).

Control sample 2 is an alloy, SRM1250 manufactured by Analytical Reference Materials International Inc., (containing Ni in 37.78 wt %, Cr in 0.08 wt %, Mo in 0.01 wt %, Co in 16.10 wt % and Al in 0.99 wt %).

Control sample 3 is magnetic iron oxide particles (containing Mn in 0.14 wt %, P in 0.15 wt %, S in 0.19 wt %, Si in 0.36 wt %, Co in 3.19 wt %, Zn in 1.26 wt %, Ca in 0.07 wt % and Na in 0.02 wt %).

Control sample 4 is ferromagnetic metal particles (containing Nd in 2.73 wt % and Na in 0.001 wt %).

Control sample 5 is ferromagnetic metal particles (containing Sr in 0.97 wt %).

Control sample 6 is ferromagnetic metal particles (containing Ba in 1.40 wt % and Ca in 0.40 wt %).

Control sample 7 is ferromagnetic metal particles (containing La in 2.69 wt %).

Control sample 8 is ferromagnetic metal particles (containing Y in 1.98 wt %).

In the control samples 1 and 2, the wt % of the elements are based on the data sheet available by the manufacturers, and the wt % of the elements contained in the control samples 3 through 8 are the values obtained by analyzing the samples through an ICP emission spectrochemical analyzer. The wt % values is input as the element composition of each control sample so as to carry out a FP method calculation. The FP method calculation is carried out through a Fundamental Parameter Software, Version 2.1 manufactured by Technos, Inc. under the following conditions.

Sample model:Bulk sample

Balance component sample:Fe

Input component:Measured X-ray intensity (KCPS)

Analysis unit:wt %

The wt % of the elements calculated out are each converted into the wt % of the element corresponding to 100 wt % of Fe atoms so as to be a quantitative value.

TABLE 2

(Measurement conditions of α-iron oxide particles surface composition in a lower coated layer)

| Element | Measurement range (B.E.) | Lowest count | Quantitative range (value from a peak position) | Sensitivity coefficient |
|---|---|---|---|---|
| Fe | 725–770 | 1,000,000 | 6eV on high B.E.side, 7eV on low B.E.side | 10.540 |
| Co | 800–770 | 1,000,000 | 12eV on high B.E.side, 8eV on low B.E.side | 12.200 |
| Ni | 875–845 | 300,000 | 15eV on high B.E.side, 6eV on low B.E.side | 13.920 |
| Nd | 244–220 | 50,000 | 6eV on high B.E.side, 6eV on low B.E.side | 2.710 |
| Y | 172–152 | 100,000 | 6eV on high B.E.side, 5eV on low B.E.side | 6.240 |
| La | 854–830 | 1,000,000 | 9eV on high B.E.side, 6eV on low B.E.side | 26.490 |
| Si | 165–145 | 60,000 | 5eV on high B.E.side, 6eV on low B.E.side | 0.855 |
| Al | 88–68 | 50,000 | 4eV on high B.E.side, 4eV on low B.E.side | 0.570 |
| Ca | 355–342 | 100,000 | 10eV on high B.E.side, 5eV on low B.E.side | 5.130 |
| Ba | 808–790 | 1,000,000 | 5eV on high B.E.side, 5eV on low B.E.side | 17.040 |
| Sr | 150–130 | 300,000 | 5eV on high B.E.side, 4eV on low B.E.side | 5.290 |
| Na | 1088–1060 | 1,500,000 | 4eV on high B.E.side, 5eV on low B.E.side | 7.990 |
| P | 150–125 | 100,000 | 6eV on high B.E.side, 6eV on low B.E.side | 1.250 |

With the component elements present on the surface of ferromagnetic metal particles, the average element present ratio may be obtained in the following manner.

The XPS surface analyzer is so set as to meet the following conditions.

X-ray anode:Mg

Resolving power:1.5–1.7 eV (specified by the half-width of $3d_{5/2}$ of clean Ag.)

No adhesive tape is not used for fixing the samples. There is no special limitation to the XPS surface analyzer, but any apparatus thereof may be used. However, an ESCALAB.200R manufactured by VG Co. is used in the invention.

A narrow scanning is carried out within the measurement range shown in Table 2, so that the spectra of each element are measured. At that time, it is required that the data taking intervals is set to be 0.2 eV and an integration is to be made until the objective peak is counted up to a count exceeding the following lowest count.

The energy position is so corrected as to correspond to the resulting spectra by setting the Cls peak position to be 284.6 eV.

Next, for data-processing on a COMMON DATA PROCESSING SYSTEM Ver. 2.3 manufactured by VAMAS-SCA-JAPAN or thereafter (hereinafter abbreviated to VAMAS Soft), the above-mentioned spectra are transferred to a computer capable of using the VAMAS Soft by making use of a soft available by each apparatus manufacturer.

And, after the spectra subject to transfer are converted into a VAMAS Format by making use of VAMAS Soft, the data processing is carried out.

In advance of starting a quantitative processing, each element is calibrated by a Count Scale and a five-point smoothing treatment is then carried out.

The quantitative treatment is as follows.

Around the peak positions of each element, a peak area intensity is obtained in the following quantitative range. The percentages of the atoms in number of each element are obtained by making use of the sensitivity coefficient shown in the following table. The resulting percentages of the atoms in number are made to be a quantitative value by converting them into the atoms in number corresponding to 100 Fe atoms in number.

However, with the samples containing Co and Ba each coexisting on the surfaces thereof, the following measurement and data-processing are to be carried out, because the both element peak positions are overlapped.

First, an XPS measurement is made on Control Sample $BaF_2$ (manufactured by Electronic Space Products, Inc. under the above-mentioned measurement conditions. The resulting peak area intensities of $Ba3d_{5/2}$ and $Ba4p_{3/2}$ are regarded as I ($Ba3d_{5/2}$ :$BaF_2$)

I ($Ba4p_{3/2}$:$BaF_2$).

Next, the sensitivity coefficient of $Ba4p_{3/2}$ is corrected. When the corrected sensitivity coefficient of $Ba4p_{3/2}$ is regarded as modified-S.F. ($Ba4p_{3/2}$).

Modified $S.F.(Ba4p_{3/2})=I(Ba3d_{5/2}\cdot BaF_2)/I(Ba4p_{3/2}\cdot BaF_2) \times S.F.(Ba3d_{5/2})$ An XPS measurement is made on a sample containing Co and Ba coexisting together, and the resulting peak area intensity of $Ba4p_{3/2}$ is regarded as I ($Ba4p_{3/2}$:the sample)

On the other hand, when regarding the mixed peak area intensity of $Ba3d_{5/2}$ and $Co2p_{3/2}$ around the peak position of 786 eV as $I(Ba3d_{5/2}+Co2p_{3/2}$:the sample), the $Co2p_3$ component peak area intensity I ($Co2p_{3/2}$:the sample) can be obtained from $I(Co2p_{3/2}$:the sample$)=\{I(Ba3d_{5/2}+Co2p_{3/2}$:the sample$)/S.F.$
$(Ba3d_{5/2})-I(Ba4p_{3/2}$:the sample$)$/modified $S.F.$ $(Ba4p_{3/2})\}\times$
$S.F.(Ba3d_{5/2})$ After completing the above-mentioned data-processing, the quantitative treatments of Ba and Co are each carried out by making use of the $Ba4p_{3/2}$ peak area intensity and $Co2p_{3/2}$ component peak area intensity, respectively.

The methods for inhibiting sodium ion from melting into water include, for example, a method in which the amounts of alkaline earth element metal ion or sodium ion each freed from ferromagnetic metal particles when the ferromagnetic metal particles is soaked in water and the amount of sodium going to be solved in a hydrochloric acid solution are controlled. The above-mentioned amounts of alkaline earth element metal ion or sodium ion each freed from ferromagnetic metal particles and the amount of sodium going to be solved in a hydrochloric acid solution are each obtained in the following boiling method.

(1) A sample is pulverized in a mortar;

(2) The pulverized sample is precisely 5.00 g-weighed on a balance;

(3) The resulting weight sample is put in a 200-ml capacity Teflon-made beaker;

(4) An accurate 100 ml of the sample is taken by a transfer pipette and is then put into a beaker;

(5) The beaker containing the sample is put on an electric heater with a thermostat and is then boiled for five minutes; and (6) The boiled sample is cooled down to approximately 20° C. with water.

EXAMPLES

Now, the invention will be detailed with reference to the following examples. However, the invention shall not be limited thereto.

The following components, proportion or ratios and the operational order may be varied, provided these parameters shall not be out of the scope of the invention. The expression, "a part" or "parts", stated in the following examples means a part or parts by weight.

(Example 1)

A paint for magnetic layer, a paint for non-magnetic layer or a paint for high magnetic permeable layer each having the following composition formula is so kneaded as to be dispersed by making use of a kneader and a sand mill. Five (5) parts of polyisocyanate (Colonate L manufactured by Japan Polyurethane Industrial Co.) were added to each of the resulting paints. Then, on a 75 μm-thick polyethylene terephthalate film, the samples mentioned in Examples 1 to 14 and the comparative examples 1 to 5 were coated in the combination as shown in Table 3, in a wet-on-wet system. After a non-orientation treatment was carried out while the coated layer is not yet dried up and the coated film was then dried successively, a surface smoothening treatment was carried out by making use of a calender, so that a raw master sheet comprising a 2.0 μm-thick layer containing non-magnetic particles and a magnetic layer having the thickness shown in Table 3 could be prepared. The resulting magnetic film was die-cut into the 86 mm-sized disks. The resulting disk is stored in a cassette, so that a 3.5 inch-floppy disk could be prepared. On the other hand, by making use of the same paints as above and on a 5.5 μm-thick polyethylene naphthalate film, the samples mentioned in Examples 1-1 to 1-16 and the comparative examples 1-1 to 1-5 were coated in the combination as shown in Table 1, in a wet-on-wet system. After a magnetic orientation treatment was carried out while the coated layer was not yet dried up and the coated film was then dried successively, a surface smoothening treatment was carried out by making use of a calender, so that a raw master sheet comprising a 2.0 µm-thick layer containing non-magnetic particles and a magnetic layer having the thickness (shown in Table 3) could be prepared. The resulting raw master sheet was slit into an 8 mm-wide tape, so that a 8 mm video tape could be prepared.

(Paint A1)

| | |
|---|---|
| Fe-Al type ferromagnetic metal particles (Fe:Co:Al:Y = 100:10:8:5 in weight ratio, the average major axis length: 100 nm, the axial ratio: 6, Hc:2,000 Oe, $\sigma_s$: 140 emu/g, and the crystallite size: 150Å) | 100 parts |
| A metal sulfonate-containing vinyl chloride type resin (MR-110 manufactured by Japan Zeon Co.) | 10 parts |
| A metal sulfonate-containing aromatic polyester polyurethane resin (UR-8300 manufactured by Toyobo, Ltd.) | 5 parts |
| Alumina ($\alpha$-Al$_2$O$_3$) (the number average particle-size: 0.2 µm) | 6 parts |
| Carbon black (The number average particle-size: 90 µm, Oil absorption: 180 ml/100 g in DBP value) | 0.8 parts |
| Stearic acid | 1 part |
| Myristic acid | 1 part |
| Glycerol trioleate | 2 parts |
| Butyl stearate | 2 parts |
| Oleyl oleate | 5 parts |
| Cyclohexanone | 100 parts |
| Methyl ethyl ketone | 100 parts |
| Toluene | 100 parts |

(Paint B)

This was the same as Paint A, except that Fe—Al type ferromagnetic metal particles used in Paint A were replaced by Co-substituted barium ferrite (having Hc: 1,100 Oe, BET: 45 m$^2$/g, σs: 64 emu/g, and tabular ratio: 4)

(Paint A2)

This was the same as Paint A, except that Fe—Al type ferromagnetic metal particles used in Paint Al were replaced by Fe:Co:Al:Ni:Si:Nd=100:10:8:5:3:5 (in weight ratio), an average major axis length: 100 nm, axial ratio: 6, Hc: 2,000 Oe, $\sigma_s$:140 emu/g, and crystallite size: 140 Å)

(Paint A3)

This was the same as Paint A, except that Fe—Al type ferromagnetic metal particles used in Paint A1 were replaced by Fe:Co:Al:Y=100:20:8:5 (in weight ratio), an average major axis length: 60 nm, axial ratio: 6, Hc: 2,200 Oe, $\sigma_s$: 140 emu/g, and crystallite size: 90 Å)

Paint formula for non-magnetic layer (Paint a: for non-magnetic layer)

| | |
|---|---|
| $\alpha$-Fe$_2$O$_3$ (that contained Si in a weight ratio of 0.2% of $\alpha$-Fe$_2$O$_3$ and Al in a weigh ratio of 1.0% of $\alpha$-Fe$_2$O$_3$, an average major axis length: 160 nm, an average minor axis length: 20 nm, a needle-form ratio: 8, and the Co contents in the whole $\alpha$-Fe$_2$O$_3$ and in the surface portion were as shown in Table 3.) | 100 parts |
| Carbon black (The number average particle-size: 15 nm, oil absorption: 60 ml/100 g (in DBP value) | 8 parts |
| A metal sulfonate-containing vinyl chloride type resin (MR-110 manufactured by Japan Zeon Co.) | 6 parts |
| A metal sulfonate-containing polyester polyurethane resin | 3 parts |
| (UR-8300 manufactured by Toyobo, Ltd.) | |
| $\alpha$-Fe$_2$O$_3$ (the number average particle-size: 0.3 µm) | 6 parts |
| Myristic acid | 1 part |
| Stearic acid | 1 part |
| Butyl stearate | 2 parts |
| Glycerol trioleate | 2 parts |
| Cyclohexanone | 100 parts |
| Oleyl oleate | 5 parts |
| Methyl ethyl ketone | 100 parts |
| Toluene | 100 parts |

(Paint a': for non-magnetic layer)

Paint a contained Si in a weigh ratio of 0.2% of $\alpha$-Fe$_2$O$_3$ and Al in a weigh ratio of 1.0% of $\alpha$-Fe$_2$O$_3$, an average major axis length: 80 nm, an average minor axis length: 20 nm, an axial ratio: 4, and the Co contents in the whole $\alpha$-Fe$_2$O$_3$ and in the surface portion were as shown in Table 3.

(Paint b)

$\alpha$-Fe$_2$O$_3$ used in Paint a was replaced by 100 parts of $\alpha$FeOOH (having an average major axis length of 160 nm, an average minor axis length of 20 nm, a needle-form ratio of 8, and containing Si in a weigh ratio of 0.2% of $\alpha$-FeOOH and Al in a weigh ratio of 1.0% of $\alpha$-FeOOH, and the Co contents in the whole $\alpha$-FeOOH and in the surface portion were as shown in Table 3.

(Paint c)

$\alpha$-Fe$_2$O$_3$ used in Paint a was replaced by 100 parts of titanium oxide (having a number average particle-size of 30 nm, and containing Si in a weigh ratio of 0.2% of TiO$_2$ and Al in a weigh ratio of 1.0% of TiO$_2$, and the Co contents in the whole titanium oxide and in the surface portion were as shown in Table 3.

The characteristics of the resulting floppy disk were measured in accordance with the following items. The measurement results thereof will be shown in Table 3.

(1) Playback output

By making use of the following drive available on the market, a recording was made by 25 sine wave signals (at 500 kHz), so that the resulting playback output was measured.

Drive: PD-211 manufactured by Toshiba, Ltd.

Measurement track: 79 tracks

The measured playback output was indicated by a value relative to the playback output obtained from the floppy disk prepared in Example 1, that was regarded as a value of 100%. The higher the playback output, the better the magnetic disk is.

(2) Durability

The subject disk was loaded on a recording apparatus and was then slidably attached to a magnetic head with a pressure of 50 g/cm$^2$ by making use of a drive for 4 MB, PD-211 manufactured by Toshiba. While rotating the disk at a disk rotation speed of 1,000 rpm, the measurement on the durable time was carried out by varying the temperature and humidity until the running time reached when the playback output was lowered down to 70% of the initial output. (A cycle of 24 hours time was repeated between 0° C. and 60° C.)

<Drop-out> (in disk)

A continuous vibration was applied for one hour to 100 pieces of 3.5-inch floppy disk sample. Then, the number of the dropped out disks was obtained, so that the resulting number was regarded as the reliability.

<Drop-out> (in tape)

The measurement was carried out on the whole length of each tape by making use of a drop-out counter, VD-5M manufactured by Japan Victor Co. In this case, an output not shorter than 15 μ/sec and 20 dB or more lowered than the output of an RF envelope was regarded as a single drop-out. The average value per minutes (a piece/min.) was thereby obtained.

<Over-write characteristics>

A 315 kHz signal was recorded on a magnetism-nuetralized sample and the playback out-put was measured (as A dB). Then, a 1 MHz signal was over written (as B dB). An over-write property B-A was obtained (as dB) from the 315 kHz out-put (as B dB).

<Specific surface resistance>

Keeping a 10 mm width-electrode apart, a sample subject to measurement was interposed, so that the surface electric resistance was measured at 100 voltage. It was indicated that the larger the value, the higher the surface electric resistance.

<Light transmittance>

Each video tape was run on an 8 mm deck (Model S-550 manufactured by Sony Corp.), so that the resulting transmission light amount was read by voltage through a Servocorder (Model SR-6312 manufactured by Watanabe & Co.) and the resulting transmission light amount was converted into the transmittance.

TABLE 3

| | Upper Layer | | Lower Layer | | Atom | | | Play- | Running | Drop- | Drop- | Over- | Specific surface | Light |
| | Paint | Layer thickness | Paint | Layer thickness | Wt % Co to Fe 100 | no. of Co to Fe 100 | Preparation process | back output (in dB) | durability (in Hr) | out (in disk) | out (in tape) | write (in dB) | resistance (in $\Omega/\square$) | transmittance (%) |
|---|---|---|---|---|---|---|---|---|---|---|---|---|---|---|
| Example 1-1 | A1 | 0.1 | a | 2.0 | 10 | 100 | Note 1) Wet-on-wet | 100 | >1000 | 0 | 1 | -50 | $1 \times 10^9$ | 1.8 |
| Example 1-2 | A1 | 0.2 | a | 2.0 | 10 | 100 | Note 1) Wet-on-wet | 98 | >1000 | 0 | 1 | -45 | $3 \times 10^9$ | 1.5 |
| Example 1-3 | A1 | 0.3 | a | 2.0 | 10 | 100 | Note 1) Wet-on-wet | 96 | >1000 | 0 | 1 | -40 | $5 \times 10^9$ | 1.2 |
| Example 1-4 | A1 | 0.5 | a | 2.0 | 10 | 100 | Note 1) Wet-on-wet | 94 | 950 | 1 | 2 | -32 | $8 \times 10^9$ | 0.9 |
| Example 1-5 | A2 | 0.2 | a | 2.0 | 10 | 100 | Note 1) Wet-on-wet | 98 | >1000 | 0 | 1 | -45 | $2 \times 10^9$ | 1.4 |
| Example 1-6 | A1 | 0.1 | a | 2.0 | 15 | 150 | Note 1) Wet-on-wet | 100 | >1000 | 0 | 0 | -50 | $7 \times 10^8$ | 1.3 |
| Example 1-7 | A1 | 0.1 | a | 2.0 | 20 | 200 | Note 1) Wet-on-wet | 100 | >1000 | 0 | 1 | -50 | $3 \times 10^8$ | 1.0 |
| Example 1-8 | A1 | 0.1 | a | 2.0 | 30 | 300 | Note 1) Wet-on-wet | 97 | >1000 | 0 | 1 | -50 | $1 \times 10^8$ | 0.5 |
| Example 1-9 | A1 | 0.1 | a | 2.0 | 1 | 20 | Note 1) Wet-on-wet | 97 | >1000 | 0 | 1 | -50 | $8 \times 10^9$ | 2.5 |
| Example 1-10 | A1 | 0.1 | a | 2.0 | 0.5 | 10 | Note 1) Wet-on-wet | 94 | >1000 | 0 | 1 | -50 | $2 \times 10^{10}$ | 3.0 |
| Example 1-11 | A1 | 0.1 | b | 2.0 | 10 | 100 | Wet-on-wet | 95 | 950 | 1 | 2 | -50 | $3 \times 10^9$ | 1.8 |
| Example 1-12 | A1 | 0.1 | c | 2.0 | 10 | 100 | Wet-on-wet | 92 | 900 | 2 | 2 | -50 | $7 \times 10^9$ | 2.5 |
| Example 1-13 | B | 0.2 | a | 2.0 | 10 | 100 | Wet-on-wet | 94 | >1000 | 0 | 1 | -45 | $3 \times 10^9$ | 1.6 |
| Example 1-14 | A1 | 0.08 | a | 2.0 | 10 | 100 | Wet-on-wet | 96 | >1000 | 0 | 1 | -52 | $5 \times 10^8$ | 2.0 |
| Example 1-15 | A1 | 0.8 | a | 2.0 | 10 | 100 | Wet-on-wet | 90 | 900 | 2 | 2 | -25 | $5 \times 10^{10}$ | 0.7 |
| Example 1-16 | A3 | 0.1 | a' | 2.0 | 20 | 200 | Wet-on-wet | 110 | >1000 | 0 | 1 | -50 | $5 \times 10^8$ | 1.2 |
| Comparative Example 1-1 | A1 | 0.1 | a | 2.0 | 0 | 0 | Wet-on-wet | 92 | 750 | 4 | 5 | -50 | $1 \times 10^{11}$ | 3.5 |
| Comparative Example 1-2 | A1 | 0.1 | b | 2.0 | 0 | 0 | Wet-on-wet | 88 | 700 | 6 | 8 | -50 | $2 \times 10^{11}$ | 3.6 |
| Comparative Example 1-3 | A1 | 0.1 | c | 2.0 | 0 | 0 | Wet-on-wet | 85 | 650 | 8 | 8 | -50 | $3 \times 10^{11}$ | 4.7 |
| Comparative Example 1-4 | A1 | 0.1 | a | 2.0 | 10 | 100 | Note 2) Wet-on-dry | *Not measurable | *Not measurable | *Not measurable | *Not measurable | *Not measurable | *Not measurable | *Not measurable |
| Comparative Example 1-5 | A2 | 0.1 | a | 2.0 | 10 | 100 | Note 2) Wet-on-dry | *Not measurable | *Not measurable | *Not measurable | *Not measurable | *Not measurable | *Not measurable | *Not measurable |

TABLE 3-continued

| Upper Layer | | Lower Layer | | Atom | | | Play-back output (in dB) | Running dura-bility (in Hr) | Drop-out (in disk) | Drop-out (in tape) | Over-write (in dB) | Specific surface resistance (Ω/□) | Light transmittance (%) |
|---|---|---|---|---|---|---|---|---|---|---|---|---|---|
| Paint | Layer thickness | Paint | Layer thickness | Wt % Co to Fe 100 | no. of Co to Fe 100 | Preparation process | | | | | | | |

Note 1)
The upper magnetic layer was coated while the lower non-magnetic layer remained undried.
Note 2)
After drying and calendering the lower non-magnetic layer, the upper magnetic layer was coated.
* No measurable sample was obtained, because the coatability was deteriorated.

As is obvious from the results shown in Table 3, it can be proved that, in the scope of the invention, the excellent characteristics can be displayed extending over the playback out-put, running durability, drop-out, over-write, specific surface resistance and light transmittance.

(Example 2)

A paint for magnetic layer and a paint for non-magnetic layer each having the following composition formula were so kneaded as to be dispersed by making use of a kneader and a sand mill. Five (5) parts of polyisocyanate (Colonate L manufactured by Japan Polyurethane Industrial Co.) were added to each of the resulting paints. Then, on a 10 μm-thick polyethylene terephthalate film, the samples mentioned in Examples 2-1 to 2-16 and the comparative examples 2-1 to 2-6 were coated in the combination as shown in Table 4, in a wet-on-wet system. After an orientation treatment was carried out while the coated layer was not yet dried up and the coated film was then dried successively, a surface smoothening treatment was carried out by making use of a calender, thereby a raw master sheet comprising a layer containing non-magnetic particles and a magnetic layer was so prepared that the magnetic layer and non-magnetic layer each had 0.2 μm and 2.0 μm in thick, respectively. With the resulting every sample, the particularly preferable scope of the invention was displayed and, therefore, the resulting comparative samples were also within the scope of the invention.

Magnetic paint for the upper layer use
(Paint UA)

| | |
|---|---|
| Fe-Al type ferromagnetic metal particles<br>Fe:Co:Al:Y = 100:10:8:5 (in weight ratio)<br>(Major axis length: 0.07 μm, σs: 145 emu/g,<br>BET specific surface area: 55 m²/g,<br>crystallite size: 150Å, axial ratio: 6) | 100 parts |
| A metal sulfonate-containing vinyl chloride type resin<br>(MR-105 manufactured by Japan Zeon Co.) | 10 parts |
| A metal sulfonate-containing aromatic polyester polyurethane<br>(UR-8300 manufactured by Toyobo, Ltd.) | 5 parts |
| Alumina<br>(α-Al₂O₃, average particle-size: 0.2 μm) | 6 parts |
| Carbon black<br>(The number average particle-size: 100 nm,<br>DBP oil absorption: 150 ml/100 g) | 0.8 parts |
| Stearic acid | 1 part |
| Myristic aced | 1 part |
| Butyl stearate | 2 parts |
| Oleyl oleate | 5 parts |
| Cyclohexanone | 100 parts |

| | |
|---|---|
| Methyl ethyl ketone | 100 parts |
| Toluene | 100 parts |

(Paint UB)

This paint was the same as Paint UA, except that Fe—Al type ferromagnetic metal particles used in Paint UA were replaced by Co-substituted barium ferrite (having Hc: 1100 Oe, BET: 45 m²/g, σs: 64 emu/g, tabular ratio: 4).

Non-magnetic paint for the lower layer use
(Paint L-A1)

| Particles comprising principally α-Fe₂O₃ 100 parts | | | | | | |
|---|---|---|---|---|---|---|
| | Fe | Co | Al | Si | Ca | Ba |
| Surface composition (in number of atoms) | 100 | 10 | 13 | 3 | 4 | 9 |
| Whole compostition (in weight ratio) | 100 | 3 | 5 | 1 | 0.1 | 2.0 |

| | |
|---|---|
| (Major axis length: 0.16 μm, Minor axis length: 0.02 μm, needle-form ratio: 8) | 100 parts |
| Carbon black<br>(having number average particle-size: 15 nm,<br>DBP oil absorption: 60 ml/100 g) | 30 parts |
| A metal sulfonate-containing vinyl chloride type resin<br>(MR-110 manufactured by Japan Zeon Co.) | 6 parts |
| A metal sulfonate-containing polyester polyurethane resin<br>(UR-8300 manufactured by Toyobo, Ltd.) | 3 parts |
| Alumina<br>(α-Al₂O₃, number average particle-size: 0.3 μm) | 6 parts |
| Myristic acid | 1 part |
| Stearic acid | 1 part |
| Butyl stearate | 2 parts |
| Glycerol trioleate | 2 parts |
| Oleyl oleate | 5 parts |
| Cyclohexanone | 100 parts |
| Methyl ethyl ketone | 100 parts |
| Toluene | 100 parts |

(Paint L-A2)

This paint was the same as Paint L-A1, except that the composite elements used in Paint L-A1 were changed as shown in Table 4.

(Paint L-A3)

This paint was the same as Paint L-A1, except that α-Fe₂O₃ used in Paint L-A1 was changed in the composite element ratio as shown in Table 4.

(Paint L-B1)

This paint was the same as Paint L-A1, except that α-Fe₂O₃ used in Paint L-A1 was changed in the composite element ratio as shown in Table 4.

(Paint L-B2)
This paint was the same as Paint L-A1, except that α-Fe₂O₃ used in Paint L-A1 was changed in the composite element ratio as shown in Table 4.
(Paint L-B3)
This paint was the same as Paint L-A1, except that α-Fe₂O₃ used in Paint L-A1 was changed in the composite element ratio as shown in Table 4.
(Paint L-C1)
This paint was the same as Paint L-A1, except that α-Fe₂O₃ used in Paint L-A1 was changed in the composite element ratio as shown in Table 4.
(Paint L-C2)
This paint was the same as Paint L-A1, except that α-Fe₂O₃ used in Paint L-A1 was changed in the composite element ratio as shown in Table 4.
(Paint L-C3)
This paint was the same as Paint L-A1, except that α-Fe₂O₃ used in Paint L-A1 was changed in the composite element ratio as shown in Table 4.
(Paint L-D1)
This paint was the same as Paint L-A1, except that α-Fe₂O₃ used in Paint L-A1 was changed in the composite element ratio as shown in Table 4.
(Paint L-A3')
This paint was the same as Paint L-A1, except that α-Fe₂O₃ used in Paint L-A1 was changed in the composite element ratio as shown in Table 4 and 10 parts of carbon black were used.
(Paint L-A3")
This paint was the same as Paint L-A1, except that α-Fe₂O₃ used in Paint L-A1 was changed in the composite element ratio as shown in Table 4 and 50 parts of carbon black were used.
(Paint L-E1)
This paint was the same as Paint L-A1, except that α-Fe₂O₃ used in Paint L-A1 was changed in the composite element ratio as shown in Table 4.
(Paint L-E2)
This paint was the same as Paint L-A1, except that α-Fe₂O₃ used in Paint L-A1 was changed in the composite element ratio as shown in Table 4.
(Paint L-F1)
This paint was the same as Paint L-A1, except that α-Fe₂O₃ used in Paint L-A1 was changed in the composite element ratio as shown in Table 4.
(Paint L-F2)
This paint was the same as Paint L-A1, except that α-Fe₂O₃ used in Paint L-A1 was changed in the composite element ratio as shown in Table 4.
(Paint L-G1)
This paint was the same as Paint L-A1, except that α-Fe₂O₃ used in Paint L-A1 was changed in the composite element ratio as shown in Table 4.
(Paint L-G2)
This paint was the same as Paint L-A1, except that α-Fe₂O₃ used in Paint L-A1 was changed in the composite element ratio as shown in Table 4.
(Paint L-Z)
This paint was the same as Paint L-A1, except that α-FeOOH was used for non-magnetic particles and the composite element ratios were changed as shown in Table 4.

Further, the paint having the following composition was coated on the foregoing polyethylene terephthalate surface (i.e., the rear surface) opposite to the side having these lower and upper layers and was then dried and calendered in the foregoing calendering conditions, so that a 0.8 μm-thick back-coat layer could be formed and, thereby a wide raw master magnetic tape could be prepared.

| Paint for back-coat layer use | |
|---|---|
| Carbon black (Raven 1035 having a number average particle-size of 25 nm) | 40 parts |
| Barium sulfate (having a number average particle-size of 300 nm) | 10 parts |
| Nitrocellulose | 25 parts |
| Polyurethane type resin (N-2301 manufactured by Japan Polyurethane Co.) | 25 parts |
| Polyisocyanate compound (Colonate L manufactured by Japan Polyurethane Co.) | 10 parts |
| Cyclohexanone | 400 parts |
| Methyl ethyl ketone | 250 parts |
| Toluene | 250 parts |

The resulting magnetic film was cut into 8 mm in width so as to prepare a magnetic recording medium for video use. On the resulting magnetic recording medium, the following evaluation were made. The results thereof will be shown in Table 4.

TABLE 4

| | | | | Lower layer | | | | | | | | | | | Magnetic property | | | Electro magnetic | | |
|---|---|---|---|---|---|---|---|---|---|---|---|---|---|---|---|---|---|---|---|---|
| | | | C.B. added amt.* (in wt %) | Surface composition Fe ratio (in at %) | | | | | | Whole composition, Fe ratio (in wt %) | | | | | Coercive force (in Hc) | Saturated magnetic flux, (in Bm) | Surface roughness (in nm) | | conversion property 7 MHz, (in dB) | | Specific surface resistance (in Ω/sq) |
| Example | Upper layer Paint | Paint | | Co | Al | Si | Ca | Ba | Co | Al | Si | Ca | Ba | | | Density | Ra | R10z | RF-OUT | Y-C/N | |
| Example 2-1 | UA | L-A1 | 30 | 10 | 13 | 3 | 4 | 9 | 3 | 5 | 1 | 0.1 | 2.0 | 200 | 4 | 1.4 | 13.9 | 4.0 | 2.5 | 5 × 10⁸ |
| Example 2-2 | UA | L-A2 | 30 | 10 | 4 | 11 | 6 | 9 | 3 | 1 | 5 | 0.2 | 2.1 | 250 | 5 | 1.5 | 14.8 | 3.9 | 2.4 | 2 × 10⁸ |
| Example 2-3 | UA | L-A3 | 30 | 10 | 12 | 13 | 4 | 10 | 3 | 5 | 5 | 0.1 | 2.2 | 200 | 5 | 1.5 | 14.6 | 3.8 | 2.4 | 4 × 10⁸ |
| Example 2-4 | UA | L-B1 | 30 | 24 | 12 | 3 | 6 | 11 | 15 | 5 | 1 | 0.2 | 1.9 | 560 | 32 | 1.2 | 12.3 | 4.5 | 3.0 | 3 × 10⁸ |
| Example 2-5 | UA | L-B2 | 30 | 24 | 3 | 12 | 6 | 9 | 15 | 1 | 5 | 0.2 | 2.0 | 550 | 35 | 1.3 | 13.1 | 4.2 | 2.9 | 1 × 10⁸ |

TABLE 4-continued

| | | | C.B. added amt.* (in wt %) | Lower layer | | | | | | | | | | Magnetic property | | Electro magnetic | | | |
|---|---|---|---|---|---|---|---|---|---|---|---|---|---|---|---|---|---|---|---|
| | Upper | | | Surface composition | | | | | | Whole composition, | | | | Coercive force | Saturated magnetic flux, | Surface roughness | | conversion property 7 MHz, (in dB) | | Specific surface resistance |
| | layer | | | Fe ratio (in at %) | | | | | | Fe ratio (in wt %) | | | | (in | Density (in nm) | | | RF- | Y- | (in |
| Example | Paint | Paint | | Co | Al | Si | Ca | Ba | Co | Al | Si | Ca | Ba | Hc) | (in Bm) | Ra | R10z | OUT | C/N | Ω/sq) |
| Example 2-6 | UA | L-B3 | 30 | 24 | 12 | 14 | 5 | 9 | 15 | 5 | 5 | 0.1 | 2.0 | 525 | 34 | 1.2 | 13.6 | 3.9 | 2.7 | $2 \times 10^8$ |
| Example 2-7 | UA | L-C1 | 30 | 45 | 12 | 2 | 7 | 10 | 30 | 5 | 1 | 0.1 | 2.1 | 970 | 48 | 1.3 | 13.2 | 4.1 | 2.8 | $4 \times 10^8$ |
| Example 2-8 | UA | L-C2 | 30 | 45 | 4 | 10 | 5 | 10 | 30 | 1 | 5 | 0.3 | 2.1 | 960 | 45 | 1.3 | 13.5 | 3.9 | 2.7 | $7 \times 10^8$ |
| Example 2-9 | UA | L-C3 | 30 | 45 | 13 | 11 | 7 | 11 | 30 | 5 | 5 | 0.1 | 2.0 | 965 | 40 | 1.4 | 14.0 | 4.0 | 2.5 | $2 \times 10^8$ |
| Example 2-10 | UB | L-B1 | 30 | 24 | 12 | 3 | 5 | 10 | 15 | 5 | 1 | 0.2 | 2.0 | 560 | 32 | 1.5 | 15.0 | 3.7 | 2.3 | $5 \times 10^8$ |
| Example 2-11 | UB | L-B2 | 30 | 24 | 3 | 12 | 4 | 10 | 15 | 1 | 5 | 0.3 | 2.2 | 550 | 35 | 1.4 | 14.1 | 3.9 | 2.7 | $4 \times 10^8$ |
| Example 2-12 | UB | L-B3 | 30 | 24 | 12 | 14 | 6 | 9 | 15 | 5 | 5 | 0.1 | 2.0 | 525 | 34 | 1.5 | 14.7 | 3.8 | 2.4 | $5 \times 10^8$ |
| Example 2-13 | UA | L-A3' | 10 | 10 | 12 | 13 | 7 | 10 | 3 | 5 | 5 | 0.1 | 2.1 | 200 | 5 | 1.2 | 12.3 | 4.6 | 3.0 | $2 \times 10^{10}$ |
| Example 2-14 | UA | L-A3" | 50 | 10 | 12 | 13 | 9 | 11 | 3 | 5 | 5 | 0.2 | 2.0 | 200 | 5 | 1.5 | 14.9 | 3.7 | 2.4 | $3 \times 10^7$ |
| Example 2-15 | UA | L-D1 | 30 | 24 | 12 | 12 | 0 | 0 | 15 | 5 | 5 | 0.0 | 0.0 | 545 | 35 | 1.5 | 15.0 | 3.7 | 2.3 | $6 \times 10^8$ |
| Example 2-16 | UA | L-Z | 30 | 20 | 10 | 13 | 5 | 9 | 15 | 5 | 5 | 0.1 | 1.8 | 350 | 15 | 1.5 | 15.0 | 3.6 | 2.3 | $1 \times 10^8$ |
| Comparative example 2-1 | UA | L-E1 | 30 | 0.5 | 6 | 5 | 5 | 11 | 0.2 | 5 | 5 | 0.3 | 2.0 | 120 | 1 | 2.5 | 26.4 | 2.5 | 1.0 | $4 \times 10^8$ |
| Comparative example 2-4 | UA | L-E2 | 30 | 110 | 5 | 4 | 6 | 10 | 52 | 5 | 5 | 0.1 | 2.1 | 1020 | 112 | 1.4 | 13.4 | 3.0 | 1.5 | $5 \times 10^8$ |
| Comparative example 2-3 | UA | L-F1 | 30 | 25 | 0 | 24 | 4 | 9 | 15 | 0 | 5 | 0.2 | 2.0 | 540 | 35 | 2.2 | 22.8 | 2.8 | 1.2 | $4 \times 10^8$ |
| Comparative example 2-4 | UA | L-F2 | 30 | 25 | 60 | 21 | 7 | 9 | 15 | 102 | 5 | 0.1 | 2.0 | 545 | 33 | 2.4 | 25.1 | 2.5 | 1.1 | $3 \times 10^8$ |
| Comparative example 2-5 | UA | L-G1 | 30 | 25 | 23 | 0 | 8 | 10 | 15 | 5 | 0 | 0.1 | 2.2 | 550 | 36 | 2.3 | 24.7 | 2.6 | 1.1 | $6 \times 10^8$ |
| Comparative example 2-6 | UA | L-G2 | 30 | 25 | 22 | 105 | 6 | 10 | 15 | 5 | 101 | 0.3 | 2.1 | 560 | 35 | 2.2 | 23.2 | 2.7 | 1.3 | $5 \times 10^8$ |

*C.B. added amount is expressed in terms of a wt % of carbon black to non-magnetic powder (a-Fe2O3, or a-FeOOH)

It can be proved from the contents of the table that some examples of the invention selected from the above-mentioned examples can display more excellent characteristics under the optimized conditions.

Evaluation

<The surface composition of particles mainly comprising $\alpha$-$Fe_2O_3$ and the whole composition thereof>

The compositions thereof were measured in the procedures described in the text of this specification.

<Magnetic properties>

Hc and Bm were measured by making use of Model VSM-3 manufactured by Toh-Ei Industrial Co., Ltd.

As for the magnetic properties of the lower non-magnetic layer, the coercive force (Hc) would be better to be not higher than 1,000 Oe and the saturated magnetic flux (Bm) would be better to be Not higher than 100 Gauss.

<Surface roughness>

The measurement was carried out by making use of a tally step roughness meter manufactured by Rank Taylor Hobson Co.

In the measurement conditions, the stylus size was 2.5× 0.1 µm, needle pressure was 2 mg, cut-off filter was at 0.33 Hz, measurement speed was 2.5 µm/sec., and base length was 0.5 mm.

<Electromagnetic properties>

By making use of a 8 mm video camera, CCDV-900 manufactured by Sony, the RF out-put (dB) and CN (dB) were measured at 7 MHz. The C/N ratio was found out from the output difference between 7 MHz and 6 MHz.

<Specific surface resistance>

Keeping a 10 mm width-electrode apart, a sample subject to measurement was interposed, so that the surface electric resistance was measured at 100 voltage. It was indicated that the larger the value, the higher the surface electric resistance.

What is claimed is:

1. A magnetic recording medium comprising a support having thereon a substantially non-magnetic layer containing non-magnetic particles dispersed in a binder and a magnetic layer containing ferromagnetic particles dispersed in a binder, wherein said non-magnetic particles are $\alpha$-$Fe_2O_3$ or $\alpha$-FeOOH, each of which contains Co in an amount of 0.5 to 30% by weight of the content of Fe.

2. The magnetic recording medium of claim 1, wherein said $\alpha$-$Fe_2O_3$ is in a form of particles, Co being contained in a surface portion of the $\alpha$-$Fe_2O_3$ particles and a ratio of Fe:Co by number of atoms being within a range of 100:10 to 100:300.

3. A magnetic recording medium comprising a support having thereon a lower substantially non-magnetic layer containing non-magnetic particles dispersed in a binder and a magnetic layer coated on the lower layer and containing ferromagnetic particles dispersed in a binder, wherein said non-magnetic particles are $\alpha$-$Fe_2O_3$ or $\alpha$-FeOOH in the form of a needle having an axial ratio of 2 to 20, Co being contained in a surface portion of said non-magnetic particles in an amount of 1 to 100 by number of atoms based on Fe being 100 by number of atoms; and said magnetic recording medium having a surface roughness of 1.5 nm or less based on a center-line mean roughness and 15.0 nm or less based on a ten-point mean roughness.

4. The magnetic recording medium of claim 3, wherein Si and Al are contained in the surface portion of said non-magnetic particles, each in an amount of 1 to 50 by number of atoms based on Fe being 100 by number of atoms.

5. The magnetic recording medium of claim 4, wherein an alkali earth metal is contained in the surface portion of the non-magnetic particles, in an amount of 1 to 50 by number of atoms based on Fe being 100 by number of atoms.

6. The magnetic recording medium of claim 4, wherein an alkali earth metal is contained in the surface portion of the non-magnetic particles, in an amount of 0.01 to 20 by number of atoms based on Fe being 100 by number of atoms.

7. The magnetic recording medium of claim 3, wherein said non-magnetic particles are mainly comprised of $\alpha\text{-}Fe_2O_3$.

8. A magnetic recording medium comprising a support having thereon a lower substantially non-magnetic layer containing non-magnetic particles dispersed in a binder and a magnetic layer coated on the lower layer and containing ferromagnetic particles dispersed in a binder, wherein said non-magnetic particles are $\alpha\text{-}Fe_2O_3$ or $\alpha\text{-}FeOOH$ or metal hydroxide in the form of a needle having an axial ratio of 2 to 20, Co being contained in a surface portion of said non-magnetic particles in an amount of 0.5 to 50 by number of atoms based on Fe being 100 by number of atoms; and said magnetic recording medium having a surface roughness of 1.5 nm or less based on a center-line mean roughness and 15.0 nm or less based on a ten-point mean roughness.

9. The magnetic recording medium of claim 8, wherein Si and Al are contained in the surface portion of said non-magnetic particles, each in an amount of 0.1 to 20 by number of atoms based on Fe being 100 by number of atoms.

10. The magnetic recording medium of claim 8, wherein said non-magnetic particles are comprised mainly of $\alpha\text{-}Fe_2O_3$.

* * * * *